(12) United States Patent
Park et al.

(10) Patent No.: US 10,827,291 B2
(45) Date of Patent: Nov. 3, 2020

(54) AUDIO APPARATUS ADAPTABLE TO USER POSITION

(71) Applicant: SAMSUNG ELECTRONICS CO., LTD., Gyeonggi-do (KR)

(72) Inventors: Jee-hoon Park, Seongnam-si (KR); David Law, San Jose, CA (US); Phillip Vasquez, San Jose, CA (US); Robin Hayes, Castro Valley, CA (US); You-na Choo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/663,940

(22) Filed: Oct. 25, 2019

(65) Prior Publication Data

US 2020/0059744 A1 Feb. 20, 2020

Related U.S. Application Data

(63) Continuation of application No. 16/176,724, filed on Oct. 31, 2018, now Pat. No. 10,499,172, which is a
(Continued)

(51) Int. Cl.
*H04R 29/00* (2006.01)
*G01S 5/18* (2006.01)
(Continued)

(52) U.S. Cl.
CPC .............. *H04R 29/007* (2013.01); *G01S 5/18* (2013.01); *G01S 5/22* (2013.01); *H04M 1/60* (2013.01);
(Continued)

(58) Field of Classification Search
CPC ........ H04R 29/007; H04R 27/00; H04R 1/02; H04R 5/02; H04R 5/04; H04R 2201/021;
(Continued)

(56) References Cited

U.S. PATENT DOCUMENTS 10,034,111 B1 7/2018 Barbier et al.
10,154,358 B2 * 12/2018 Park .......................... G01S 5/18
(Continued)

FOREIGN PATENT DOCUMENTS

| DE | 40 27 338 A1 | 3/1992 |
| EP | 2706662 A2 | 3/2014 |
| EP | 2 884 764 A1 | 6/2015 |

OTHER PUBLICATIONS

Communication dated Apr. 1, 2019 issued by the European Intellectual Property Office in counterpart European Application No. 16921115.8.
(Continued)

*Primary Examiner* — Andrew L Sniezek
(74) *Attorney, Agent, or Firm* — Sughrue Mion, PLLC

(57) ABSTRACT

An audio apparatus adaptable to a user position is provided. The audio apparatus may include a plurality of sub-modules placed at separate locations from one another, each sub-module of the plurality of sub-modules including a loudspeaker configured to generate sound and a communicator configured to perform communication. The first sub-module among the plurality of sub-modules may include a processor that processes an audio signal to be output as sound through the loudspeaker of the first sub-module, determines a user's position with respect to each of the plurality of sub-modules, and changes a state of the sound being output from the loudspeaker of the first sub-module in accordance with the determined position of the user.

19 Claims, 17 Drawing Sheets

Related U.S. Application Data continuation of application No. 15/350,631, filed on Nov. 14, 2016, now Pat. No. 10,154,358.

(60) Provisional application No. 62/256,958, filed on Nov. 18, 2015.

(51) Int. Cl.
*G01S 5/22* (2006.01)
*H04R 27/00* (2006.01)
*H04M 1/60* (2006.01)
*H04S 7/00* (2006.01)
*H04R 1/02* (2006.01)
*H04R 5/02* (2006.01)
*H04R 5/04* (2006.01)

(52) U.S. Cl.
CPC ............... *H04R 27/00* (2013.01); *H04R 1/02* (2013.01); *H04R 5/02* (2013.01); *H04R 5/04* (2013.01); *H04R 2201/021* (2013.01); *H04R 2227/005* (2013.01); *H04R 2420/07* (2013.01); *H04R 2430/01* (2013.01); *H04R 2499/15* (2013.01); *H04S 7/301* (2013.01); *H04S 7/303* (2013.01); *H04S 2400/13* (2013.01)

(58) Field of Classification Search
CPC .......... H04R 2227/005; H04R 2420/07; H04R 2430/01; H04R 2499/15; G01S 5/18; G01S 5/22; H04M 1/60; H04S 7/301; H04S 7/303; H04S 2400/13
See application file for complete search history.

(56) References Cited

U.S. PATENT DOCUMENTS

| | | | |
|---|---|---|---|
| 10,499,172 B2 * | 12/2019 | Park | ....................... H04R 27/00 |
| 2002/0161577 A1 | 10/2002 | Smith | |
| 2005/0152565 A1 | 7/2005 | Jouppi et al. | |
| 2005/0221792 A1 * | 10/2005 | Mattisson | ............. H04M 1/605 455/355 |
| 2007/0172083 A1 | 7/2007 | Tseng et al. | |
| 2008/0019497 A1 * | 1/2008 | Hajji | ................... H04M 3/4935 379/218.01 |
| 2009/0017791 A1 | 1/2009 | Besson | |
| 2010/0329082 A1 | 12/2010 | Houg | |
| 2012/0259544 A1 | 10/2012 | Watson et al. | |
| 2013/0064042 A1 | 3/2013 | Aarts et al. | |
| 2014/0067380 A1 | 3/2014 | Helletzgruber et al. | |
| 2014/0177844 A1 | 6/2014 | Greff et al. | |
| 2014/0274147 A1 | 9/2014 | Kennedy et al. | |
| 2015/0265151 A1 | 9/2015 | Islam | |
| 2015/0279354 A1 | 10/2015 | Gruenstein et al. | |
| 2016/0021481 A1 | 1/2016 | Johnson et al. | |
| 2016/0065828 A1 | 3/2016 | Lee | |
| 2016/0174011 A1 | 6/2016 | Rider et al. | |
| 2018/0115844 A1 * | 4/2018 | Lu | ............................ H04R 3/12 |
| 2019/0361667 A1 * | 11/2019 | Chen | ....................... G06F 3/165 |

OTHER PUBLICATIONS

Communication dated Aug. 7, 2017 from the International Searching Authority in application No. PCT/KR2016/013430.
Notice of Allowance issued in parent U.S. Appl. No. 15/350,631 dated Jul. 30, 2018.
Office Action issued in U.S. Appl. No. 15/350,631 dated Aug. 2, 2017.
Office Action issued in U.S. Appl. No. 15/350,631 dated Mar. 19, 2018.
Office Action issued in U.S. Appl. No. 15/350,631 dated Nov. 21, 2017.
Office Action issued in U.S. Appl. No. 16/176,724 dated Apr. 10, 2019.
Notice of Allowance issued in U.S. Appl. No. 16/176,724 dated Jul. 24, 2019.
Communication dated Jul. 9, 2019 issued by the European Patent Office in counterpart European Patent Application No. 16921115.8.

* cited by examiner

AUDIO APPARATUS ADAPTABLE TO USER POSITION

CROSS-REFERENCE TO RELATED APPLICATIONS

This is a Continuation of U.S. application Ser. No. 16/176,724 filed Oct. 31, 2018, which is a Continuation of U.S. application Ser. No. 15/350,631 filed on Nov. 14, 2016 (now U.S. Pat. No. 10,154,358), which claims the benefit of U.S. Provisional Application No. 62/256,958 filed on Nov. 18, 2015 in the United States Patent and Trademark Office, the disclosures of which are incorporated herein by reference.

BACKGROUND

1. Field

Apparatuses and methods consistent with the exemplary embodiments relate to an audio apparatus and a computer readable medium, which can process and output an audio signal from various sources to generate a sound or transmit the audio signal to an external apparatus, and more particularly to an audio apparatus and a computer-readable medium that allow a user to control various devices by the user's voice without direct manual manipulation.

2. Description of the Related Art

To compute and process information in accordance with certain processes, an electronic apparatus typically includes a central processing unit (CPU), a chipset, a memory, and like electronic components for computation. Such an electronic apparatus may be classified variously in accordance with what type of information will be processed therein. For example, the electronic apparatus may be classified as an information processing apparatus, such as a personal computer, a server, or the like for processing general information; an image processing apparatus for processing video information; and an audio apparatus for processing audio information. Such various electronic apparatuses are respectively provided as independent apparatuses to perform their own preassigned functions.

Among the electronic apparatuses, the audio apparatus refers to an apparatus capable of processing an audio signal in accordance with audio processing methods, and may be achieved in various forms according to the input/output methods of the audio signal. For example, in terms of the input method, the audio apparatus may receive an audio signal from an external apparatus through a communication module or generate an audio signal based on a sound received from an external environment through the microphone. In terms of the output method, the audio apparatus may output the processed audio signal as a sound through a loudspeaker or transmit the processed audio signal to an external apparatus through the communication module.

Such an audio apparatus generally provides a specific function as a single device. For example, a user usually uses audio apparatuses that specifically correspond to desired functions such as music playing, control of other devices, messaging, etc. Moreover, if a user wants to fill a space in the user's house with the sound output from an audio apparatus, a home theater or like system needs to undergo a setup process. Although an audio apparatus may have a simple structure or be convenient to use, the performance of the audio apparatus may fall short of a user's expectations. For instance, a house may not have an open floor plan and have a complicated shape because of placement of walls and other structures. Therefore, a single audio apparatus may be insufficient to fill this space with the sound.

Further, an audio apparatus supporting many functions often has a button, a touch screen or like interface that requires a user's physical manipulation. When the audio apparatus is used at home or at an office, this may be inconvenient for the user because the user has to approach such an interface for controlling the audio apparatus.

In this regard, it is desirable if the audio apparatus enables a user to easily control its various and complicated functions without the user's direct touch with the interface.

SUMMARY

According to an aspect of an exemplary embodiment, there is provided an audio apparatus including a plurality of sub-modules placed at separate locations from one another, each sub-module including a loudspeaker configured to generate sound and a communicator configured to perform communication. A first sub-module among the plurality of sub-modules includes a processor that processes an audio signal to be output as sound through the loudspeaker of the first sub-module, determines a position of a user with respect to each sub-module of the plurality of sub-modules, and changes a state of the sound being output from the loudspeaker of the first sub-module in accordance with the determined position of the user. Thus, the audio apparatus can provide an environment optimized for enabling a user to listen to a sound corresponding to user's position, wherever user is.

The processor may define an area corresponding to positions of the plurality of sub-modules based on distances between the plurality of sub-modules, and may determine the position of the user with respect to the defined area. Thus, the audio apparatus determines a user's relative position based on a layout of the sub-modules.

The first sub-module may further include a microphone configured to receive a sound input, and the processor may determine a distance between the first sub-module and a second sub-module among the plurality of sub-modules, based on a time taken by ultrasonic waves being output from the loudspeaker of the first sub-module, reflected from the second sub-module, and received by the microphone of the first sub-module. Thus, the audio apparatus determines a distance between the sub-modules in order to determine the layout of the sub-modules.

The processor may receive information about a distance between the second sub-module and a third sub-module among the plurality of sub-modules, from the second sub-module or the third sub-module through the communicator of the first sub-module. Thus, information about the distance between two sub-modules, which cannot be directly determined by the first sub-module, is obtained, so that the first sub-module can determine an area formed by the plurality of sub-modules.

The processor may determine the position of the user by determining an angle of the user with respect to each sub-module of the plurality of sub-modules within the defined area. Thus, the audio apparatus determines a user's relative position with respect to the sub-module.

The first sub-modules may include at least two microphones configured to receive sounds, and the processor may determine the user's position based on a phase difference between the sounds respectively received by the at least two microphones. Thus, the sub-module is able to easily determine a user's relative position.

The processor may select one channel of a plurality of channels within the audio signal, the selected channel corresponding to the user's determined position. The processor may control a volume level of the selected channel to be different from volume levels of remaining channels of the plurality of channels. Thus, the audio apparatus can provide a sound output environment optimized for a user at the user's current position.

The processor may control a volume level of the sound being output through the loudspeaker in accordance with the determined position of the user. Thus, the audio apparatus can provide a sound output environment optimized for a user according to the user's current position.

The first sub-module may further include a display configured to display information related to the audio signal, and a microphone configured to receive a sound input. The processor may activate the display and the microphone if the determined position of the user is closer to the first sub-module than to the second sub-module, and may deactivate the display and/or the microphone if the determined position of the user is closer to the second sub-module than to the first sub-module. Thus, the audio apparatus can provide a sub-module control environment optimized for a user at user's current position.

The first sub-module may further include a microphone configured to a speech from the user. The processor may retrieve contact information of a call recipient specified by the speech from a mobile phone connectable with the communicator of the first sub-module, and may dial the call recipient through the mobile phone. Thus, the audio apparatus enables a user to easily make a phone call by a voice recognition method through the sub-module without physically manipulating the mobile phone.

A non-transitory computer-readable medium of an audio apparatus may have a plurality of sub-modules placed at separate locations from one another. The non-transitory computer-readable medium may store program code for a method to be executed by a processor of a first sub-module among the plurality of sub-modules. The method may include processing an audio signal to be output as sound through a loudspeaker of the first sub-module, determining a position of a user with respect to each sub-module of the plurality of sub-modules, and changing a state of the sound being output from the loudspeaker of the first sub-module in accordance with the determined position of the user. Thus, the audio apparatus can provide an environment optimized for enabling a user to listen to a sound corresponding to the user's position, wherever the user is.

The determining the position of the user with respect to each sub-module of the plurality of sub-modules may include: defining an area corresponding to positions of the plurality of sub-modules based on distances between the plurality of sub-modules; and determining the position of the user with respect to the defined area. Thus, the audio apparatus determines a user's relative position based on a layout of the sub-modules.

The defining the area corresponding to the positions of the plurality of sub-modules may include: determining a distance between the first sub-module and a second sub-module among the plurality of sub-modules, based on a time taken by an ultrasonic wave to be output from the loudspeaker of the first sub-module, reflected from the second sub-module, and received by a microphone of the first sub-module. Thus, the audio apparatus determines a distance between the sub-modules in order to determine the layout of the sub-modules.

The defining the area corresponding to the positions of the plurality of sub-modules may include receiving information about a distance between the second sub-module and a third sub-module among the plurality of sub-modules, from the second sub-module and/or the third sub-module through a communicator of the first sub-module. Thus, information about the distance between two sub-modules, which cannot be directly determined by the first sub-module, is obtained, so that the first sub-module can determine an area formed by the plurality of sub-modules.

The determining the position of the user with respect to the defined area may include determining the position of the user by determining an angle of the user with respect to each sub-module of the plurality of sub-modules within the defined area. Thus, the audio apparatus determines a user's relative position with respect to the sub-module.

The determining the angle of the user with respect to each sub-module may include determining the position of the user based on a phase difference between sounds respectively received by at least two microphones of the first sub-module. Thus, the sub-module is able to easily determine a user's relative position.

The changing the state of the sound being output may include: selecting one channel of a plurality of channels within the audio signal, the selected channel corresponding to the determined position of the user; and controlling a volume level of the selected channel to be different from volume levels of remaining channels of the plurality of channels. Thus, the audio apparatus can provide a sound output environment optimized for a user at user's current position.

The changing the state of the sound being output may include: controlling a volume level of the sound in accordance with the determined position of the user. Thus, the audio apparatus can provide a sound output environment optimized for a user at the user's current position.

The first sub-module may further include a display configured to display information related to the audio signal, and a microphone configured to receive a sound input. The method may further include: activating the display and the microphone if the determined position of the user is closer to the first sub-module than to the second sub-module; and deactivating the display and/or the microphone if the determined position of the user is closer to the second sub-module than to the first sub-module. Thus, the audio apparatus can provide a sub-module control environment optimized for a user at user's current position.

The method may further include: connecting with a mobile phone; retrieving, from the mobile phone, contact information of a call recipient specified by a speech being input by the user through a microphone of the first sub-module; and dialing the call recipient through the mobile phone. Thus, the audio apparatus enables a user to easily make a phone call by a voice recognition method through the sub-module without directly manipulating the mobile phone.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the invention.

Figure 1:
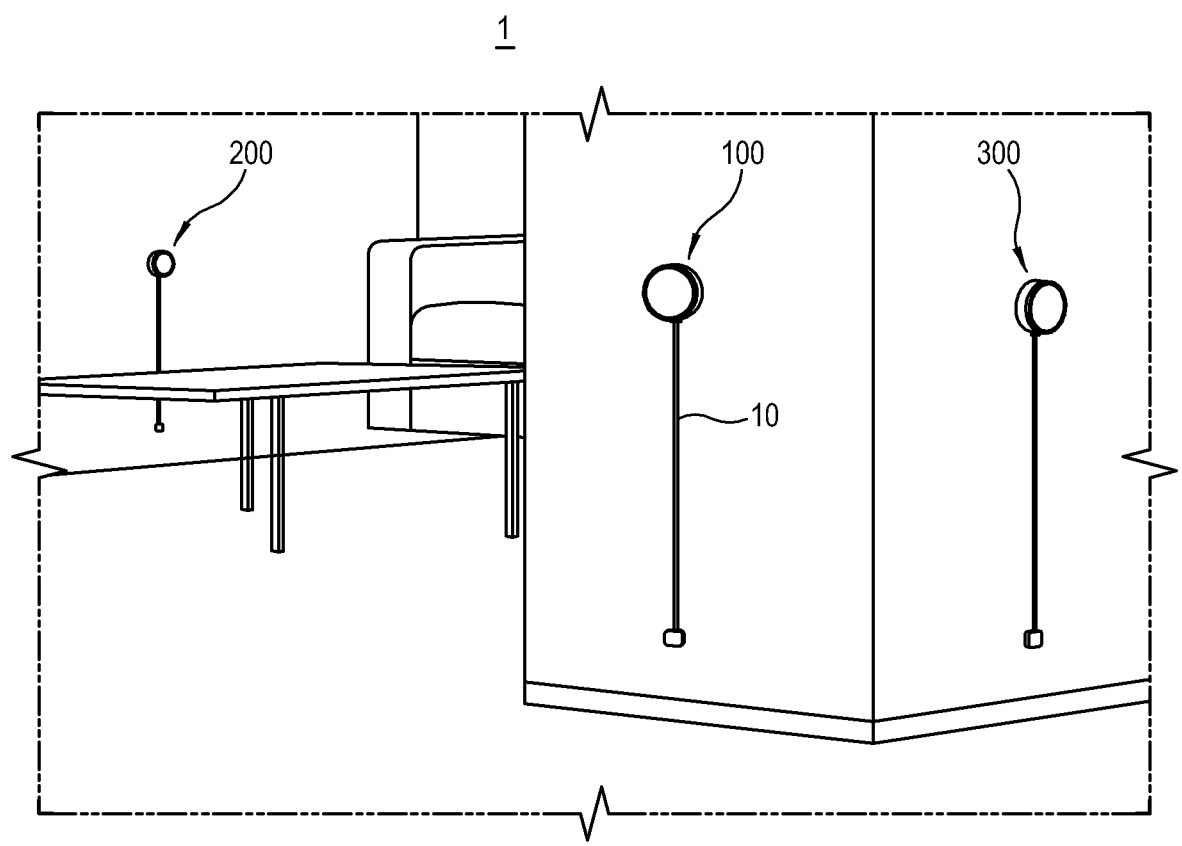
FIG. 1 illustrates an audio apparatus in an installed state according to an exemplary embodiment.

FIG. 1 illustrates an audio apparatus in an installed state according to an exemplary embodiment.

As shown in FIG. 1, an audio apparatus 1 may be installed in various places such as a home, and perform various tasks such as inputting, processing, outputting, etc. with regard to sound. The audio apparatus 1 may be supported on a vertical installation surface such as a wall, and output a sound frontward in an installed state. However, there are no limits to the installation position.

In contrast to a conventional audio apparatus provided as a single device, the audio apparatus 1 according to an exemplary embodiment may include a plurality of sub-modules 100, 200 and 300. The plurality of sub-modules 100, 200 and 300 are provided as individual devices physically separated from one another, and interwork with one another in individually processing audio signals.

The plurality of sub-modules 100, 200, and 300 may be installed at any positions desired by a user, and the installation surfaces are spaced apart by a predetermined distance rather than adjacent to one another. Further, there are no limits to the height at which the sub-modules 100, 200 and 300 may be installed. For example, the sub-modules 100, 200 and 300 may be installed at a height corresponding to a user's head so that the user can easily listen to a sound output from the sub-modules 100, 200 and 300 and so that a voice of a user can properly reach the sub-modules 100, 200 and 300.

The audio apparatus 1 may include two or more sub-modules 100, 200 and 300. In the example shown in FIG. 1, three sub-modules 100, 200 and 300 constitute a set for the audio apparatus 1, but four or more sub-modules may constitute one set as well. In this case, each of the sub-modules 100, 200 and 300 operates according to the principles of the exemplary embodiments described herein.

The sub-modules 100, 200 and 300 may connect with a power cable 10 for supplying power while being supported or mounted on the installation surface. In addition, the sub-modules 100, 200 and 300 may be provided with an internal battery for supplying power, thus foregoing the use of the power cable 10.

There may be many other ways of supplying power to each of the sub-modules 100, 200 and 300. For example, the sub-modules 100, 200 and 300 may each include an independent power generation module that generates power by transforming sunlight or like energy to electricity, or may receive power wirelessly from an external power source. In the case where the sub-modules 100, 200 and 300 use the batteries, the battery may be either rechargeable or non-rechargeable. The rechargeable batteries may be charged by a separate charging device that is separate from the sub-modules 100, 200 and 300, or may be charged with power directly supplied to the sub-modules 100, 200 and 300 by a wire or wirelessly.

The plurality of sub-modules 100, 200 and 300, when installed, may sense a user's relative position and respectively process audio signals based on the sensed position. That is, the audio apparatus 1 according to an exemplary embodiment may include the plurality of sub-modules 100, 200 and 300 installed at locations separate from one another, and each of the sub-modules 100, 200 and 300 may individually process the audio signal in accordance with a user's position, thereby providing an improved audio-processing environment for the user.

Below, details of the sub-module 100 will be described. In the audio apparatus 1, the plurality of sub-modules 100, 200 and 300 may include the same or substantially similar elements, and therefore one sub-module 100 will be representatively described in the following exemplary embodiment.

Figure 2:
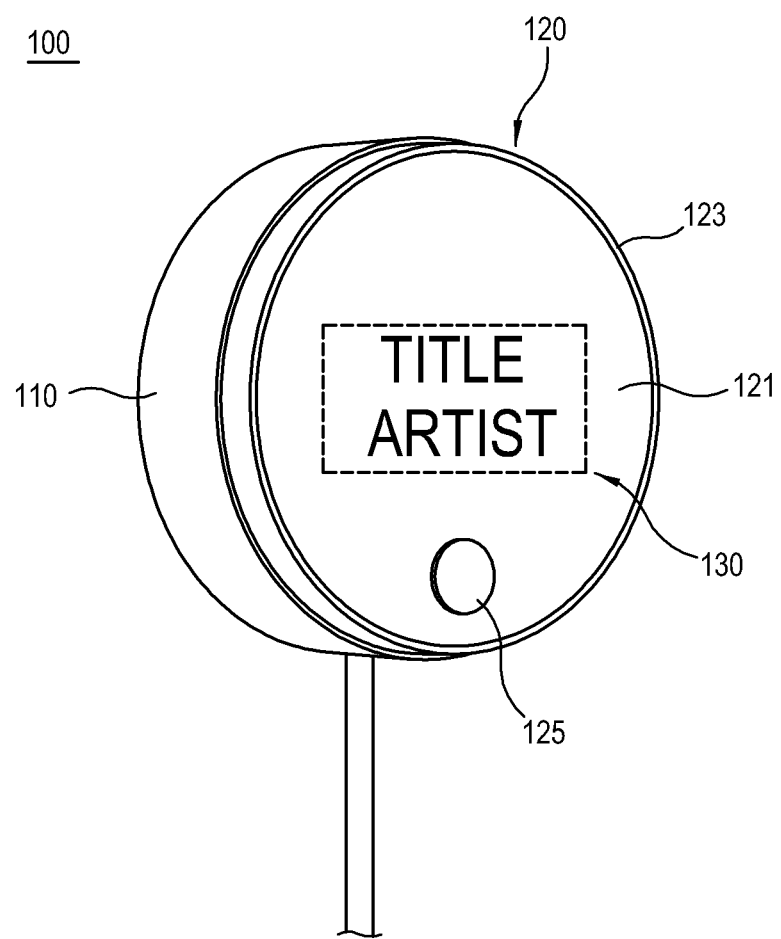
FIG. 2 is a perspective view of a sub-module of an audio apparatus.

FIG. 2 is a perspective view of a sub-module of an audio apparatus.

As shown in FIG. 2, the sub-module 100 is shaped like a circular plate having a predetermined thickness, although the sub-module 100 may have a different shape and thickness than what is shown in FIG. 2. The sub-module 100 includes a back frame 110 arranged in the back of the sub-module 100, and a front frame 120 arranged in the front of the sub-module 100. Various elements for operating the sub-module 100 are accommodated in an inner space of the sub-module 100 formed by coupling the back frame 110 and the front frame 120.

The back frame 110 may be shaped like a disc and made of metal or plastic. The space of the sub-module 100 for accommodating various elements may be formed by the back frame 110. A lateral side of the back frame 110 may have a dial-like structure, so that a user can rotate the lateral wall of the back frame 110.

The front frame 120 may be fitted to the front of the back frame 110, and cover the front of the back frame 110. The lateral side of the front frame 120 to be fitted to the back frame 110 may be made of metal or plastic. On the other hand, a disc surface 121 of the front frame 120 may be made of fabric or textile. The reason why the front frame 120 may be made of fabric instead of a hard or opaque material will be described later.

The fabric surface 121 of the front frame 120 may have various colors. By replacing only the front frame 120 of the sub-module 100, it is possible to swap in and out a front frame 120 having a color desired by a user to the sub-module 100.

The sub-module 100 may include a display 130 installed on or inside the front frame 120. The display 130 may have a structure such a liquid crystal display (LCD) panel for displaying an image or a less sophisticated display module for displaying a simple text. For example, the display 130 may be a plurality of light emitting diodes (LEDs) arranged in the form of a matrix, and display information of predetermined text as each LED is turned on/off.

Inside or on the front frame 120, a loudspeaker, a microphone, etc. as well as the display 130 may be provided. That is, because the front frame 120 is made of fabric, a user can not only recognize information displayed on the display 130 but also listen to a sound output from a loudspeaker and input a user's voice to a microphone.

The display 130 may be placed inside the front frame 120, but information displayed on the display 130 may be viewable to a user through the front frame 120 made of fabric or a screen mesh. That is, light emitted from the LED of the display 130 pass through the surface 121 of the front frame 120, so that a user can view the text information displayed on the display 130. Of course, the display 130 is not limited to the LED, and may have various structures as long as the information displayed on the display 130 may be visible to the user through the front frame 120.

Similar to the back frame 110, the front frame 120 may have a dial structure that is rotatable by a user. That is, the sub-module 100 may have two dial structures located on the lateral side of the back frame 110 and the front frame 120. Each dial structure may be turned by a user to control a function of the sub-module 100. The functions to be controlled by the dial structure will be described later.

An indicator ring 123 may be installed at the edge of the front frame 120 (i.e. around the disc surface 121 made of fabric). The indicator ring 123 may include an LED for generating light of a predetermined color. The indicator ring 123 may control its light emitting state to indicate the current state of the sub-module 100.

For example, the LED of the indicator ring 123 may be activated when the sub-module 100 is turned on, and deactivated when the sub-module 100 is turned off. Further, the indicator ring 123 may be activated when the sub-module 100 makes a sound, and remain inactive when the sub-module 100 is not generating any sound. In addition, the indicator ring 123 may be selectively activated or deactivated corresponding to whether or not the sub-module 100 enters a voice recognition mode.

A toggle button 125 may be provided in a certain area of the disc surface 121 of the front frame 120, for example, below an area corresponding to the display 130 of the fabric disc surface 121. The toggle button 125 may alternate between an ON state and an OFF state whenever a user presses the button.

Figure 3:
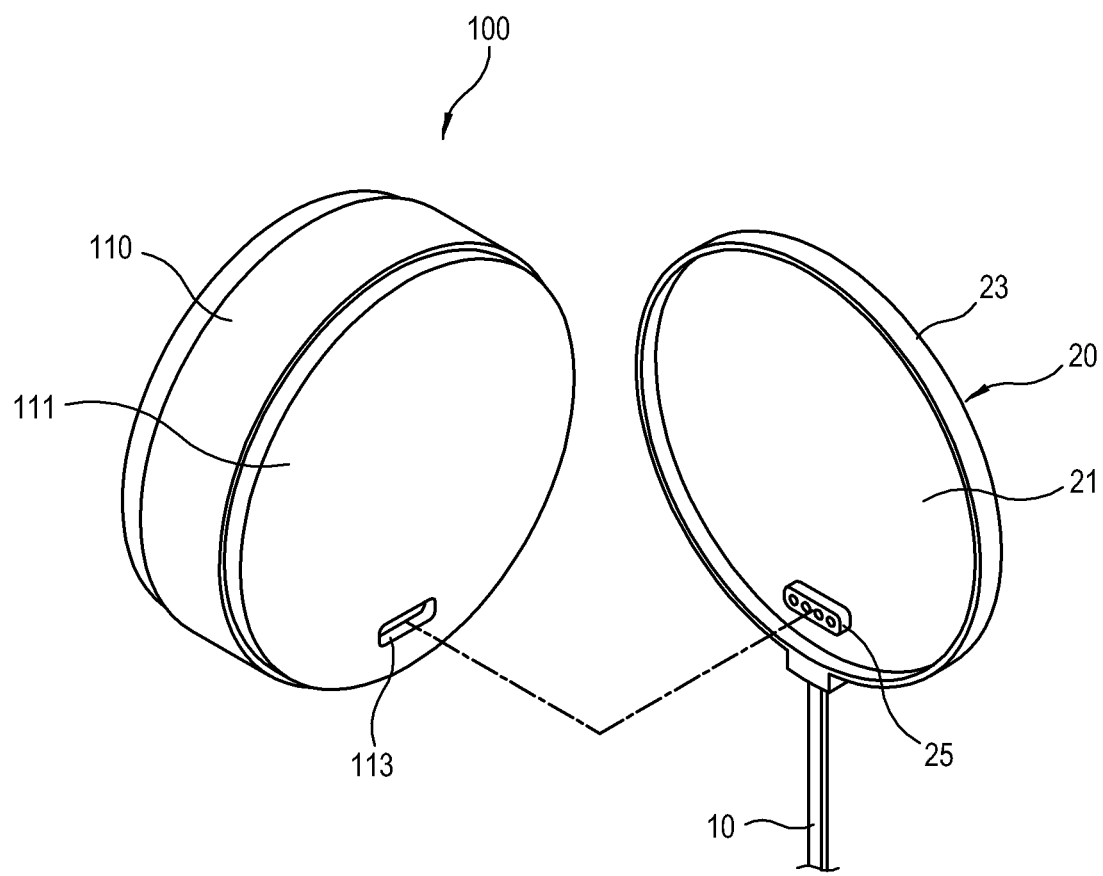
FIG. 3 is a perspective view of a structure for mounting a sub-module on an installation surface.

FIG. 3 is a perspective view of a structure for mounting a sub-module 100 on an installation surface.

As shown in FIG. 3, a separate support structure may be provided in order to support the sub-module 100 on the installation surface. For example, a bracket 20 may be fastened to the installation surface such as a wall, and the sub-module 100 may be supported on the bracket 20, thereby allowing the bracket 20 to position the sub-module 100 on the installation surface. There may be many ways of fastening the bracket 20 to the installation surface. For example, the bracket 20 may be fastened to the installation surface by a screw or adhered to the installation surface by an adhesive.

The bracket 20 may include a plate 21 and a rim 23 protruding from the surface of the plate 21 at a predetermined height. The rim 23 of the bracket 20 may be shaped corresponding to the back frame 110 of the sub-module 100, so that the back frame 110 of the sub-module 100 can be fitted to the rim 23 of the bracket 20, thereby supporting the sub-module 100 on the bracket 20. In this state, the rear surface 111 of the back frame 110 may be disposed to face the surface of the bracket 20, and the circular edge of the rear surface 111 of the back frame 110 is arranged along the rim 23 of the bracket 20.

A connector 25 electrically connecting with the power cable 10 may be provided in a certain area on the surface 21 of the bracket 20. When the sub-module 100 is attached to the bracket 20, the connector 25 of the bracket 20 may be electrically connected to a connector 113 of the sub-module 100 provided in a certain area on the rear surface 111 of the back frame 110. The connectors 25 and 113 may include corresponding electric terminals (e.g., male and female connectors) so that electric current can flow through each other when they are connected. Thus, the sub-module 100 may receive power while being supported on the bracket 20.

In this exemplary embodiment, the sub-module 100 may be supported on the bracket 20 in such a manner that the back frame 110 of the sub-module 100 is fitted to the bracket 20. However, there are no limits to the manner of attachment. Alternatively, for example, the surface 21 of the bracket 20 may include a magnet. In this case, the back frame 110 may be made of metal or another magnet so that the back frame 110 can be supported on the surface 21 of the bracket 20 by a magnetic force.

In other words, the structure by which the sub-module 100 is supported on the installation surface and receives power is not limited to the structure shown in FIG. 3.

Figure 4:
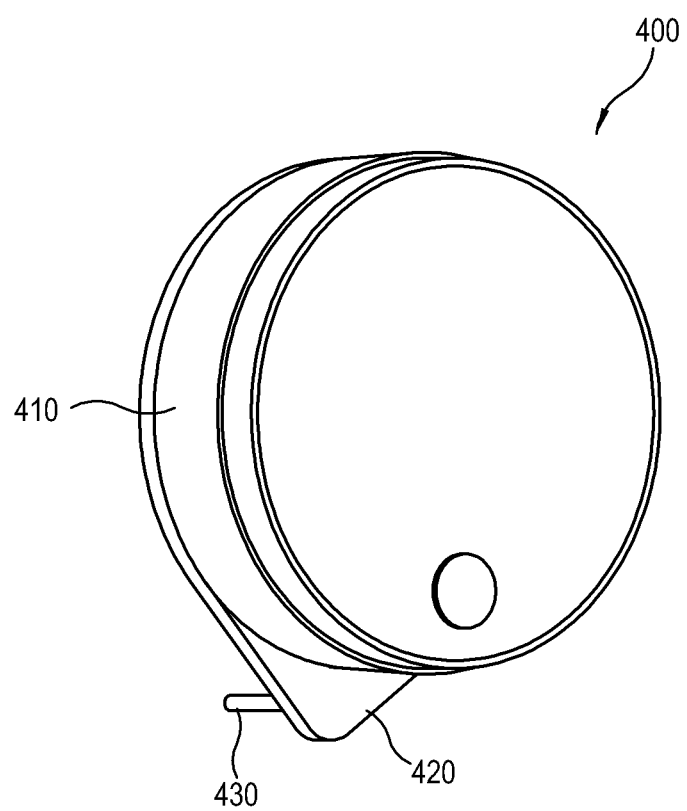
FIG. 4 is a perspective view of another structure for mounting a sub-module on an installation surface.

FIG. 4 is a perspective view of another structure for mounting a sub-module on an installation surface.

As shown in FIG. 4, a sub-module 400 may include elements such as a back frame 410. The basic structure of the sub-module 400 may be substantially equivalent to the sub-module 100 according to the foregoing exemplary embodiment, and thus repetitive descriptions thereof will be avoided.

The sub-module 400 in this exemplary embodiment is different from the sub-module 100 of the foregoing exemplary embodiment in the structure for mounting onto the installation surface. Specifically, the sub-module 400 has a sub-frame 420 protruding from a lower side of a back frame 410 and having a predetermined shape. An electric plug 430 protrudes from the back of the sub-frame 420. As the electric plug 430 is connected to a plug socket of an external power source such as a wall socket for alternating current (AC), the sub-module 400 may attach itself securely on the installation surface as well as receive power from the external power source.

Below, elements of a sub-module for processing the audio signal will be described.

Figure 5:
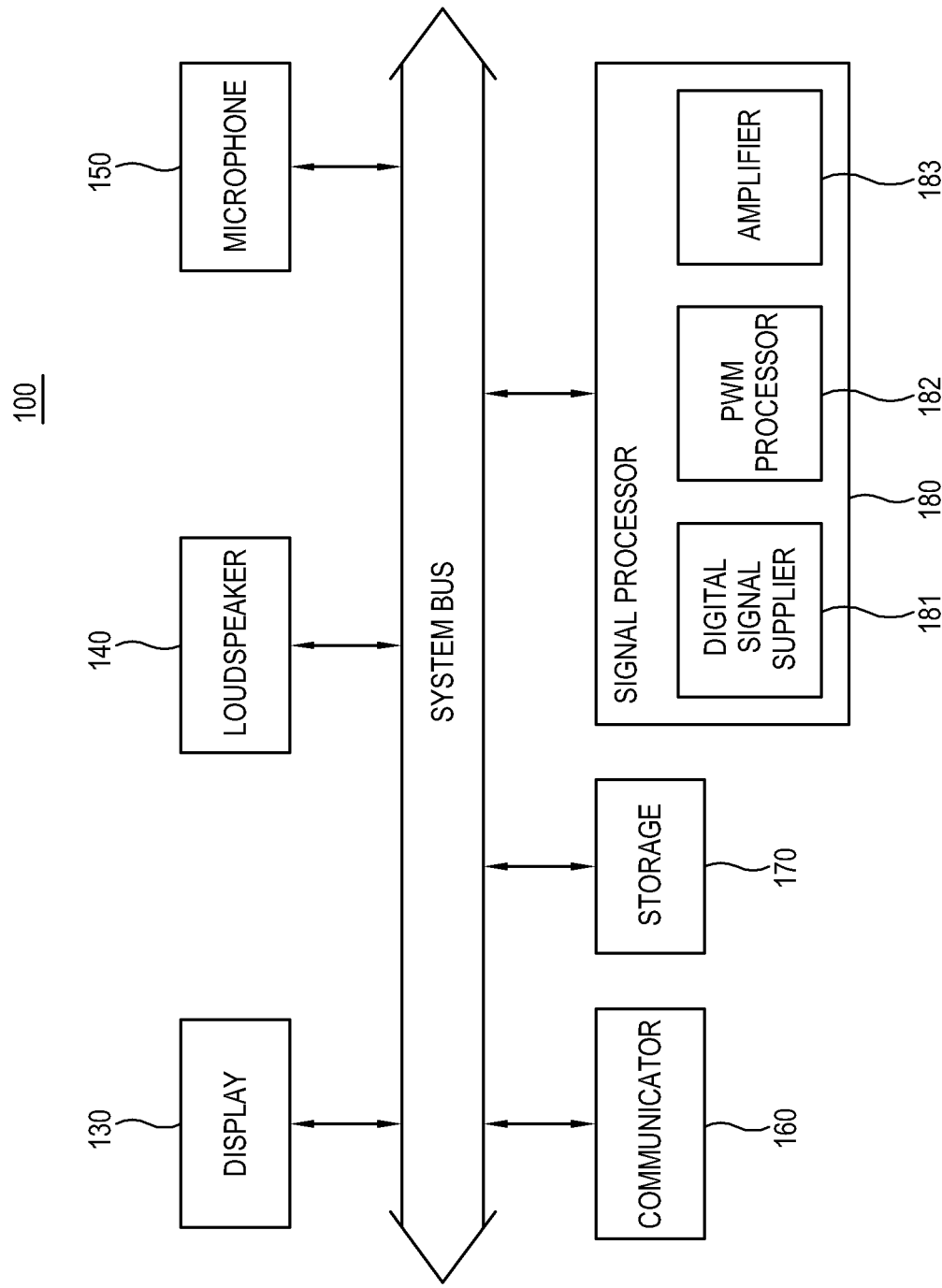
FIG. 5 is a block diagram of signal processing elements in a sub-module.

FIG. 5 is a block diagram of signal processing elements in a sub-module.

As shown in FIG. 5, the sub-module 100 may include the display 130, a loudspeaker 140 for generating sound, a microphone 150 for receiving a voice input, a communicator 160 for transmitting and receiving a signal, a storage 170 for storing data therein, and a signal processor 180 for processing a signal or data in accordance with predetermined processes. These elements of the sub-module 100 can have access to one another through a system bus, and thus they can interwork with one another. Among them, the communicator 160, the storage 170 and the signal processor 180 may be provided separately, or at least two of them may be integrated as a system-on-chip (SoC).

The display 130 may be achieved by arranging a plurality of LEDs in the form of a matrix on a printed circuit board, and display simple text information by turning on/off each of the LEDs. The display 130 may include the plurality of LEDs, and the printed circuit board, on which wires for supplying power are printed.

The loudspeaker 140 may generate sound based on the audio signal processed by the signal processor 180. The loudspeaker 140 may include unit loudspeakers corresponding to channels of the audio signal in accordance with the supported channels. For example, the loudspeaker 140 may include two left and right unit loudspeakers to support stereo channels, or may include three unit loudspeakers respectively corresponding to a left channel, a right channel and a center channel.

Besides generating sound, the loudspeaker 140 may emit ultrasonic waves for sensing the distance between the sub-module and a predetermined object. The ultrasonic waves output from the loudspeaker 140 collide with a certain object, and the reflected waves caused by this collision are collected by the microphone 150, thereby determining a distance between the sub-module 100 and the object. Use of this principle will be described later.

The microphone 150 may collect sounds generated outside the sub-module 100 and convert them into an audio signal. The audio signal may be transmitted to the signal processor 180. For example, the microphone 150 may receive a user's speech and generate an audio signal corresponding to the speech. Of course, the sound collectable by the microphone 150 is not limited to a user's speech. Alternatively, a sound made by another sub-module may be collected.

The microphone 150 may collect not only sound corresponding to a user's audible range but also reflected waves of ultrasonic waves. Further, the microphone 150 may support beamforming. To this end, at least two unit microphones 150 may be provided in the sub-module 100. The microphone 150 supporting the beamforming function is used to determine a user's relative position with respect to the sub-module 100, details of which will be described later.

The communicator 160 may be provided as a communication module chipset mounted on a printed circuit board. For convenience of easy attachment of the sub-module 100 to the installation surface, the communicator 160 may support wireless communication protocols such as wireless fidelity (Wi-Fi), Wi-Fi direct, Bluetooth, etc. In accordance with the wireless communication protocols, the communicator 160 can communicate with not only an electronic apparatus such as a television, a mobile device, a hub for Internet of Things, an access point, etc. but also with other sub-modules. In particular, the communicator 160 may support protocols previously approved for communication with other sub-modules of the audio apparatus.

The storage 170 may store data processed by the signal processor 180. The storage 170 may include a flash memory, a hard disk drive, a solid state drive or like nonvolatile memory. To make the sub-module 100 lightweight and small, the storage 170 may be achieved by the flash memory. The storage 170 may store an operating system, drivers, firmware, applications and like data to be executed for computation and operations of the signal processor 180. Further, the storage 170 may further include a random access memory (RAM) or like volatile memory so that the data can be executed by the signal processor 180.

The signal processor 180 may be achieved by a hardware circuit such as a chipset mounted on a printed circuit board, a central processing unit (CPU), a microcontroller or a system on chip (SoC). Fundamentally, the signal processor 180 may perform various processes for operating the sub-module 100, such as setting for a relative position of another sub-module, setting for a user's current position, control of the display 130, etc. in addition to processing of an audio signal. Such a process may be performed when data stored in the nonvolatile memory of the storage 170 is loaded onto the volatile memory of the storage and the signal processor 180 executes the loaded data.

Below, elements for the process of outputting an audio signal to the loudspeaker 140, among the processes of the signal processor 180, will be described in brief. The elements to be described below are concerned with the process of outputting the audio signal to the loudspeaker 140, but the signal processor 180 may further include additional elements for performing other processes.

The signal processor 180 may include a digital signal supplier 181 for outputting a digital signal of an audio signal, a pulse width modulation (PWM) processor 182 for outputting a PWM signal based on the digital signal output from the digital signal supplier 181 and an amplifier 183 for amplifying the PWM signal from the PWM processor 182.

The digital signal supplier 181 modulates an input audio signal into a digital signal of a pulse code. To this end, the digital signal supplier 181 includes a digital signal processing (DSP) chip, a Moving Picture Experts Group (MPEG) converter integrated circuit (IC), etc.

The PWM processor 182 converts a pulse code modulation signal, which output from the digital signal supplier 181 and having a small amplitude, into a low-power PWM signal.

The amplifier 183 employs a semiconductor switching device of a switching circuit (e.g. a field effect transistor (FET)) to amplify the low-power PWM signal output from the PWM processor 182 into a high-power PWM signal. For example, the amplifier 183 may receive a low-power PWM signal of about 3.3 V into a high-power PWM signal of about 5-40 V. The amplifier 183 applies low-pass filtering to the amplified high-power PWM signal and outputs the filtered signal to the loudspeaker 140.

The amplifier 183 includes an amplifying circuit and an LC filter corresponding to the number of channels of the audio signal. The amplifying circuit is an element for amplifying the input audio signal, and utilizes an FET. The LC filter, also known as a resonant circuit, is an element for filtering a signal of a certain frequency band, and uses an inductor and a capacitor.

The PWM processor 182 sends a PWM signal to each amplifying circuit of the amplifier 183. Each amplifying circuit amplifies the PWM signal individually sent from the PWM processor 182, and each LC filter filters the amplified PWM signal with respect to a certain frequency band, thereby demodulating the PWM signal and outputting the demodulated signal to the loudspeaker 140. The loudspeaker 140 makes sounds corresponding to the channels of the audio signal.

With this structure, the processing operations of the sub-module 100 in the audio apparatus 1 according to an exemplary embodiment will be described.

Figure 6:
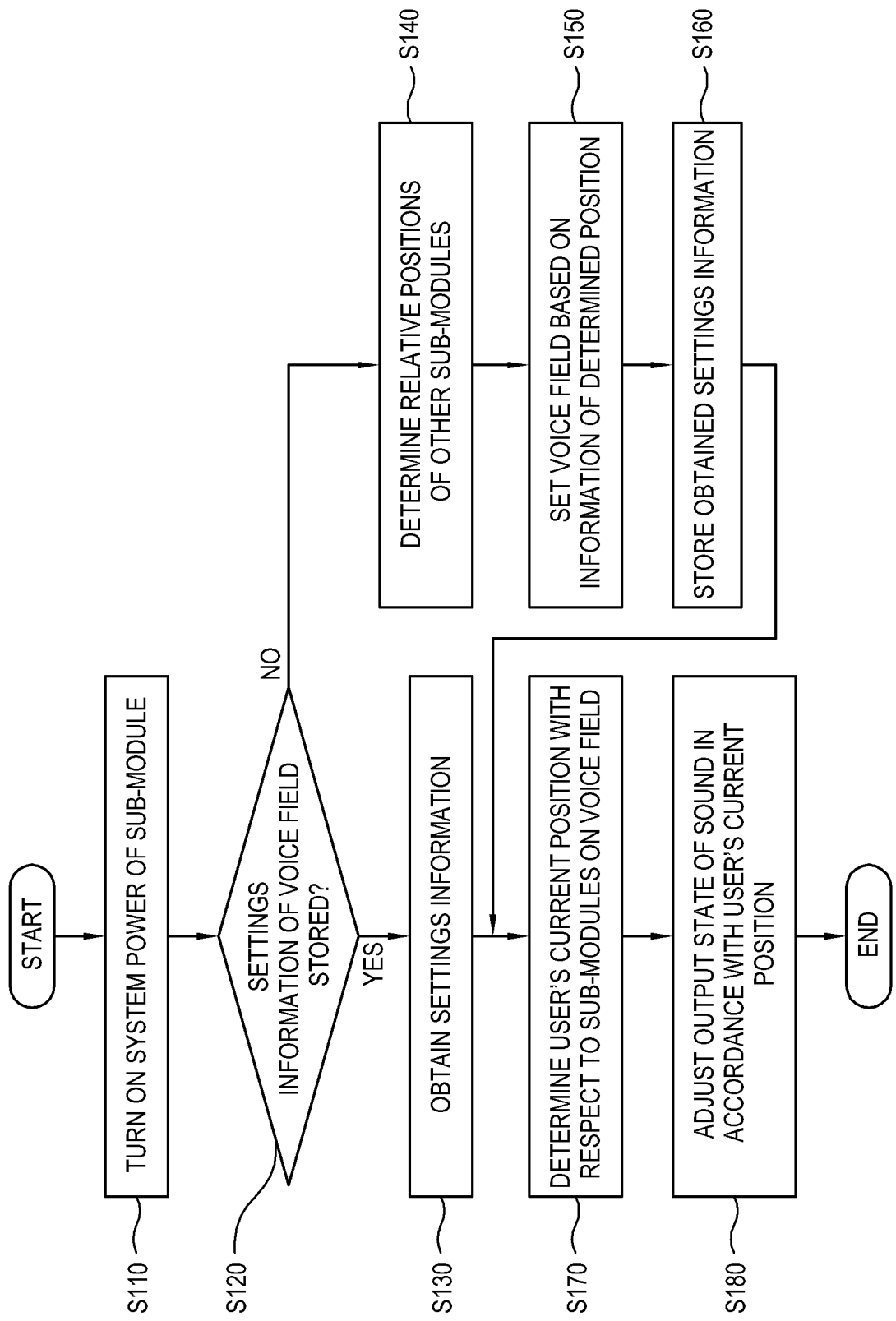
FIG. 6 is a flowchart of controlling a sub-module in an audio apparatus.

FIG. 6 is a flowchart of controlling a sub-module in an audio apparatus.

As shown in FIG. 6, at operation S110, system power of the sub-module is turned on.

At operation S120, the sub-module determines whether settings information of a voice field or a sound field is previously stored or not. Details of the voice field will be described later.

If the settings information of the voice field has been previously stored, at operation S130, the sub-module obtains the settings information of the voice field.

On the other hand, if the settings information of the voice field has not been previously stored, at operation S140, the sub-module determines relative positions of other sub-modules in the audio apparatus. Here, the respective sub-modules may share their determination information about the positions with one another.

At operation S150, the sub-module sets the voice field of the sub-modules in the audio apparatus, based on information about the determined and shared positions.

At operation S160, the sub-module stores the obtained settings information about the voice field.

When the settings information about the voice field is obtained, at operation S170, the sub-module determines a user's current position with respect to the sub-module in the voice field.

At operation S180, the sub-module adjusts an output level of a sound generated by the loudspeaker in accordance with a user's current position.

Thus, the audio apparatus may form the voice field by the plurality of sub-modules, so that each sub-module can adjust the sound output state in accordance with a user's current position. Even when a user is continuously moving within the voice field, the sound output of each sub-module may be adjusted in real time corresponding to the user's current position. Thus, the audio apparatus according to an exemplary embodiment provides a sound environment optimized for a user.

The voice field is an area formed by the plurality of sub-modules in the audio apparatus (i.e. a range or a combination of ranges of the sound input/output ranges of the sub-modules). In the case where three sub-modules constitute one set of the audio apparatus, the respective sub-modules may be arranged to form a triangular shape, and the voice field may refer to an area inside the triangle.

In practice, the range that the sound input/output of the sub-modules will reach is not only an area inside the triangular shape but also a larger area that surrounds the triangle. However, it is difficult to measure the precious range that the sound input/output of the sub-modules will reach, and therefore, it may be hard to clearly demarcate such a range. Thus, the area inside the triangle will be regarded as the voice field in this illustration for convenience.

Below, the method of setting (i.e., determining) the voice field by the sub-module will be described.

Figure 7:
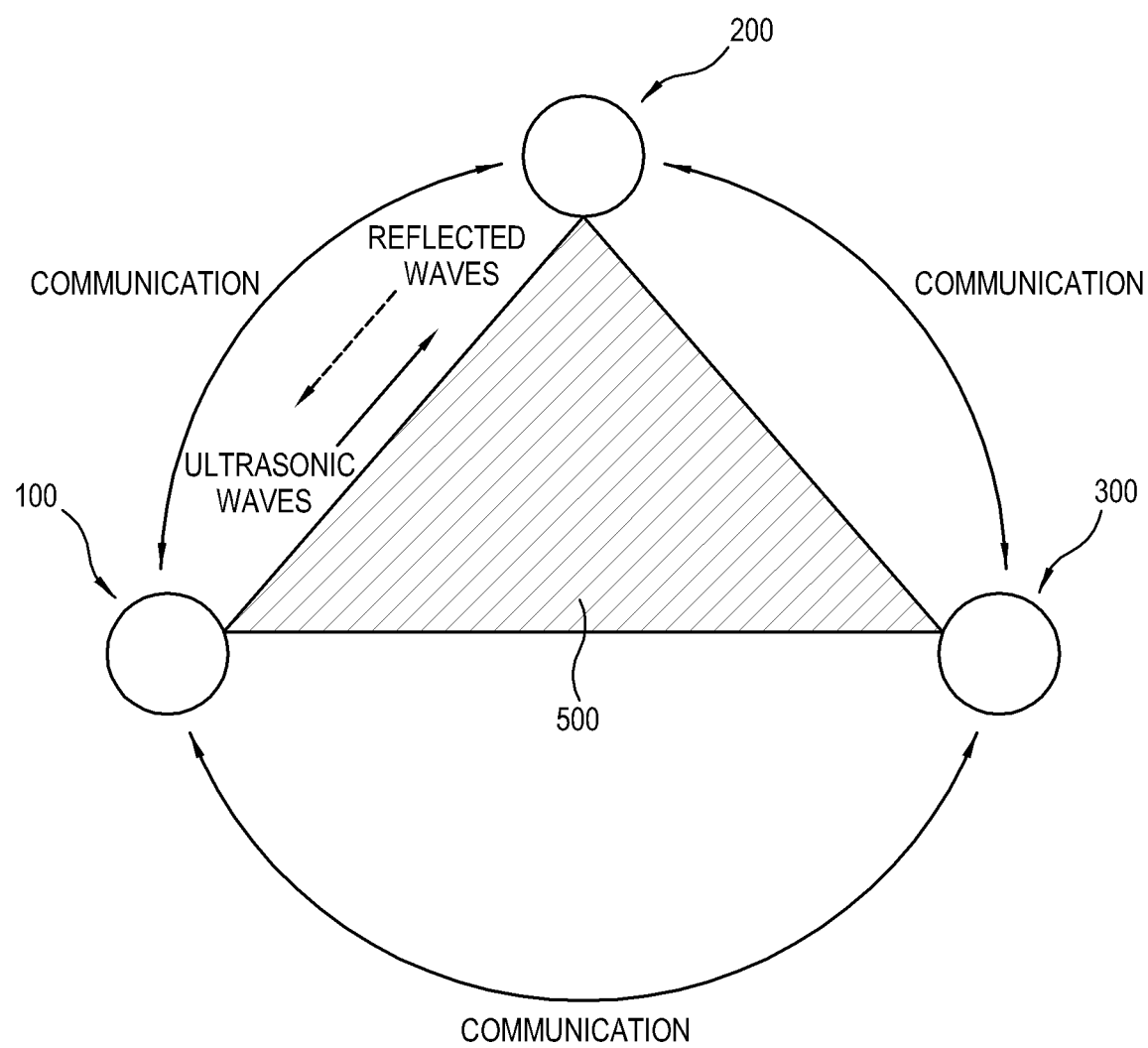
FIG. 7 illustrates a voice field generated by a plurality of sub-modules.

FIG. 7 illustrates a voice field determined by the audio apparatus 1 via the plurality of sub-modules 100, 200 and 300.

As shown in FIG. 7, the audio apparatus 1 may include three sub-modules 100, 200 and 300. A voice field 500 may include a triangular area formed by the lines connecting the sub-modules 100, 200 and 300. To determine the voice field 500, the lengths of the respective straight lines (i.e. the distances between three sub-modules 100, 200 and 300) have to be determined. Once the three distances are obtained, the voice field 500 including the triangular area formed by sides corresponding to the obtained distances may be determined. The sub-modules 100, 200 and 300 are respectively placed at the vertexes of the voice field 500.

There may be many different methods of calculating the distances between the plurality of sub-modules 100, 200 and 300. For example, ultrasonic waves may be used to measure the distances. Each loudspeaker of the sub-modules 100, 200 and 300 may not only generate sound having an audible frequency of 16-20,000 Hz, but also generate ultrasonic waves having a frequency higher than 20 kHz.

For example, the first sub-module 100 include a pulse generator to generate and emit the ultrasonic waves based on an inverse-piezoelectric effect. The first sub-module 100 alternately applies positive and negative voltages to an piezoelectric device for a short period of time, so that the piezoelectric device can alternate between deformation and restoration. Vibrating energy generated by the alternation between the deformation and restoration of the piezoelectric device is transformed into the ultrasonic waves and emitted from the first sub-module 100.

When the ultrasonic waves from the first sub-module 100 reach the second sub-module 200, the ultrasonic waves are reflected from and refracted by the second sub-module 200. The reflected waves propagate from the second sub-module 200 to the first sub-module 100.

When the first sub-module 100 receives the reflected waves, a vibrator of the first sub-module 100 generates voltage by the reflected waves based on a piezoelectric phenomenon. The generated voltage is measured by a voltmeter.

By the same principle, the first sub-module 100 transmits the ultrasonic waves and receives the reflected waves. Here, the first sub-module 100 measures a distance between the first sub-module 100 and the second sub-module 200 by measuring the time taken between the transmission and the reception of the ultrasonic waves (i.e. time elapsed from the moment when the ultrasonic waves are transmitted to the moment when the ultrasonic waves are returned from the second sub-module 200).

By the same principle, a distance between the first sub-module 100 and the third sub-module 300, and a distance between the second sub-module 200 and the third sub-module 300 may also be calculated. Because the first sub-module 100, the second sub-module 200 and the third sub-module 300 can communicate with one another, three distance parameters may be shared among the three sub-modules 100, 200 and 300 by exchanging their calculated distance information. For example, the second sub-module 200 may calculate the distance between the second sub-module 200 and the third sub-module 300, and transmit this information to the first sub-module 100 and/or the third sub-module 300.

Thus, each of the sub-modules 100, 200 and 300 determines the range of the voice field 500, and determines the respective positions of the sub-modules 100, 200 and 300 within the voice field 500.

Below, a method of determining a user's position within the voice field 500, which was determined and set as described above, will be described.

Figure 8:
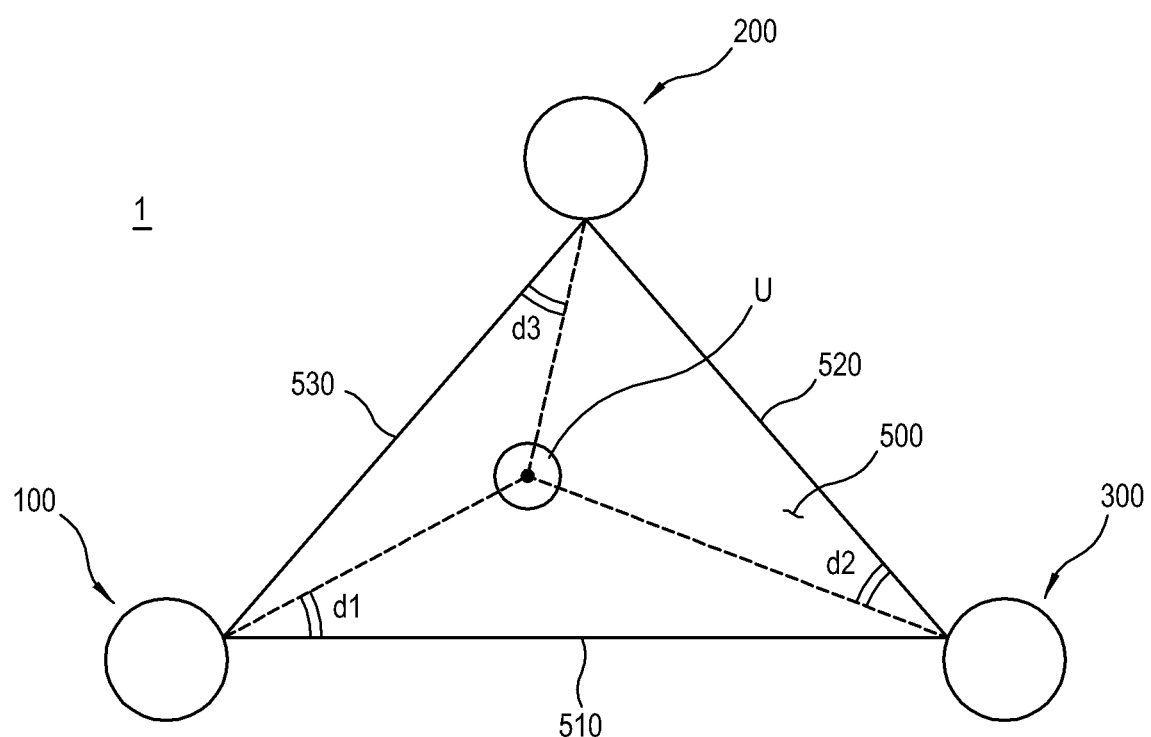
FIG. 8 illustrates a process of determining a user's position within a voice field by each sub-module in an audio apparatus.

FIG. 8 illustrates a process of determining a user's position within a voice field by each of the sub-modules 100, 200 and 300 in the audio apparatus 1.

As shown in FIG. 8, the audio apparatus 1 may include three sub-modules 100, 200 and 300, and the voice field 500 may be defined by lines 510, 520 and 530 connecting the sub-modules 100, 200 and 300.

If a user U is positioned in a certain position on the voice field 500 at a certain point of time, there are many ways of determining a relative position of the user U with respect to each of the sub-modules 100, 200 and 300. For example, a distance between the user U and each of the sub-modules 100, 200 and 300 may be measured. Alternatively, an angle between the user U and each of the sub-modules 100, 200 and 300 may be measured.

In the latter case, the relative angles between the user U and the sub-modules 100, 200 and 300 may be represented in various forms. For example, the relative angle may be given with respect to the sides of the voice field 500. The angle between the first sub-module 100 and the user U may be given as 'd1' with respect to the side 510 of the voice field 500, the angle between the second sub-module 200 and the user U may be given as 'd2' with respect to the side 520 of the voice field 500, and the angle between the third sub-module 300 and the user U may be given as 'd3' with respect to the side 530 of the voice field 500. However, these relative angles are merely examples, and there are no limits to the representations of the angles.

There may be many methods of measuring the relative angles between the user U and the sub-modules 100, 200 and 300. For example, according to a beamforming technique, the direction from which a sound is coming may be sensed by using an omnidirectional microphone. One microphone may not be enough to make use of the beamforming technique, and there may be a need of at least two microphones for respectively calculating a phase difference between respectively received sounds. That is, each of the sub-modules 100, 200 and 300 may each include at least two microphones.

Specifically, if each of the sub-modules 100, 200 and 300 is outputting its own sound, the first sub-module 100 may collect the output sounds through the microphones. The first sub-module 100 may receive information about an audio signal output from the second sub-module 200 and an audio signal output from the third sub-module 300.

The first sub-module 100 may analyze a waveform obtained by removing the respective audio signals of the sub-modules 100, 200 and 300 from the audio signal of the sound received in the microphone, thereby determining the relative angle d1 with respect to the position of the user U. The analysis of the waveform may be achieved by various methods such as comparison with a predetermined profile, comparison between the amplitude of the waveform and a known threshold value.

Likewise, the second sub-module 200 and the third sub-module 300 can calculate the angles d2 and d3 based on the foregoing principles. By this method, the sub-modules 100, 200 and 300 may determine relative positions of the user U and control their respective sound output states based on the determined positions.

There may be various examples of the kinds of sound output states that are used when each of the sub-modules 100, 200 and 300 controls the sound output state in accordance with the relative positions of a user U.

Figure 9:
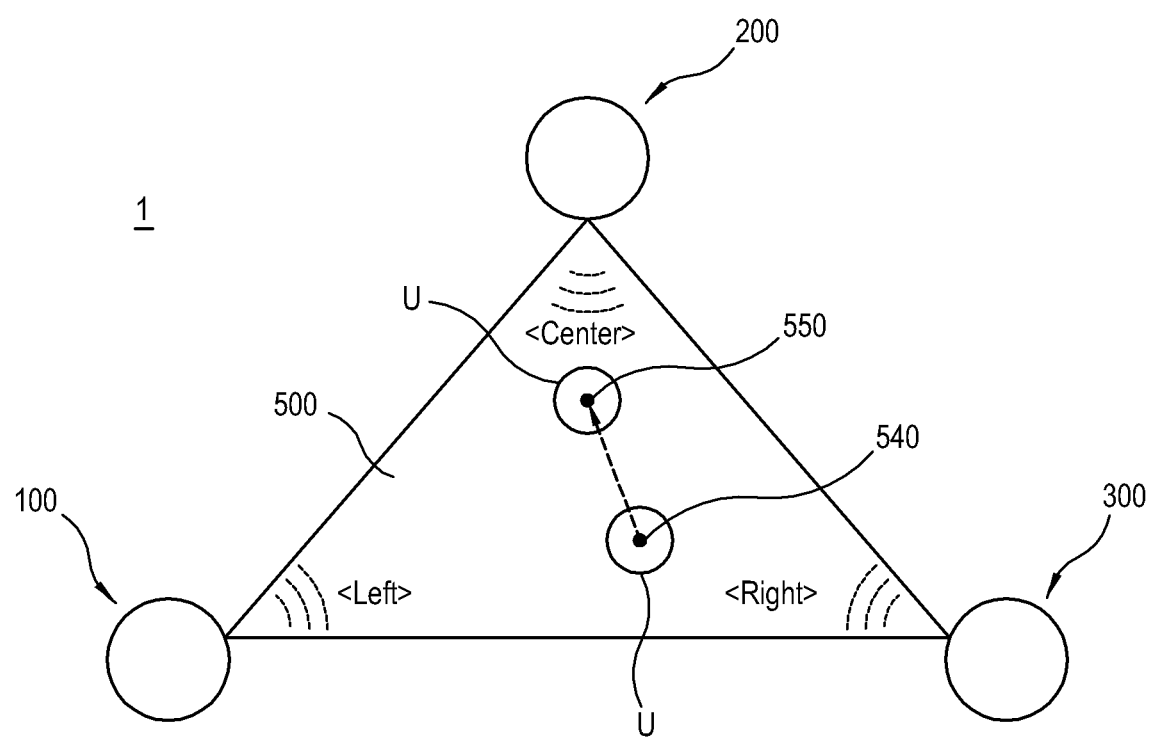
FIG. 9 illustrates sub-modules in an audio apparatus outputting sounds of a stereo channel in accordance with a user's position.

FIG. 9 illustrates the sub-modules 100, 200 and 300 in the audio apparatus 1 outputting sounds of a stereo channel in accordance with a user's position.

As shown in FIG. 9, if the user U is at a current position 550 within the voice field 500 formed by the plurality of sub-modules 100, 200 and 300, the sub-modules 100, 200 and 300 may control the output states of their sounds in accordance with the current position 550. For example, if each of the sub-modules 100, 200 and 300 outputs sounds of audio signals corresponding to a left channel, a center channel and a right channel, the sub-modules 100, 200 and 300 may be different from one another in a main output channel of the audio signals in accordance with the current position 550 of the user U. Here, a main output channel may signify that the channel is either output exclusively or that the channel has a higher volume level than the other channels.

If it is determined that the current position 550 of the user U is closest to the second sub-module 200 among the plurality of sub-modules 100, 200 and 300, the second sub-module 200 may place a relative emphasis on the sound of the center channel, and the first sub-module 100 and the third sub-module 300 may respectively place an emphasis on the sounds of the left and right channels, while outputting the sound. Here, the first sub-module 100 and the third sub-module 300 may output the sound of the left channel and the sound of the right channel with substantially the same amount of emphasis between the two.

If the user U has moved from a previous position 540 to the current position 550, the analysis may reveal that the user U is likely facing toward the second sub-module 200 currently and observing the first sub-module 100 on his left and the third sub-module 300 on his right. In this regard, the second sub-module 200 may place an emphasis on outputting the sound of the center channel, while the first sub-module 100 places an emphasis on outputting the sound of the left channel, and the third sub-module 300 places an emphasis on outputting the sound of the right channel. In brief, the audio apparatus 1 may determine a current position and/or orientation of the user U based on the user's movement history, and allow the channels of the sound output from each of the sub-modules 100, 200 and 300 to be adjusted based on the determined position and/or orientation. Such a movement history of the user U may be stored in each of the sub-modules 100, 200 and 300.

In this manner, each of the sub-modules 100, 200 and 300 in the audio apparatus 1 controls the output state of the sound in accordance with the current position 550 of the user U.

In this embodiment, each of the sub-modules 100, 200 and 300 controls the output state of the sound in accordance with the position of the user U, but the present disclosure is not limited thereto. For example, each of the sub-modules 100, 200 and 300 may control various operation modes as well as the output state of the sound depending on the design of the audio apparatus 1.

Figure 10:
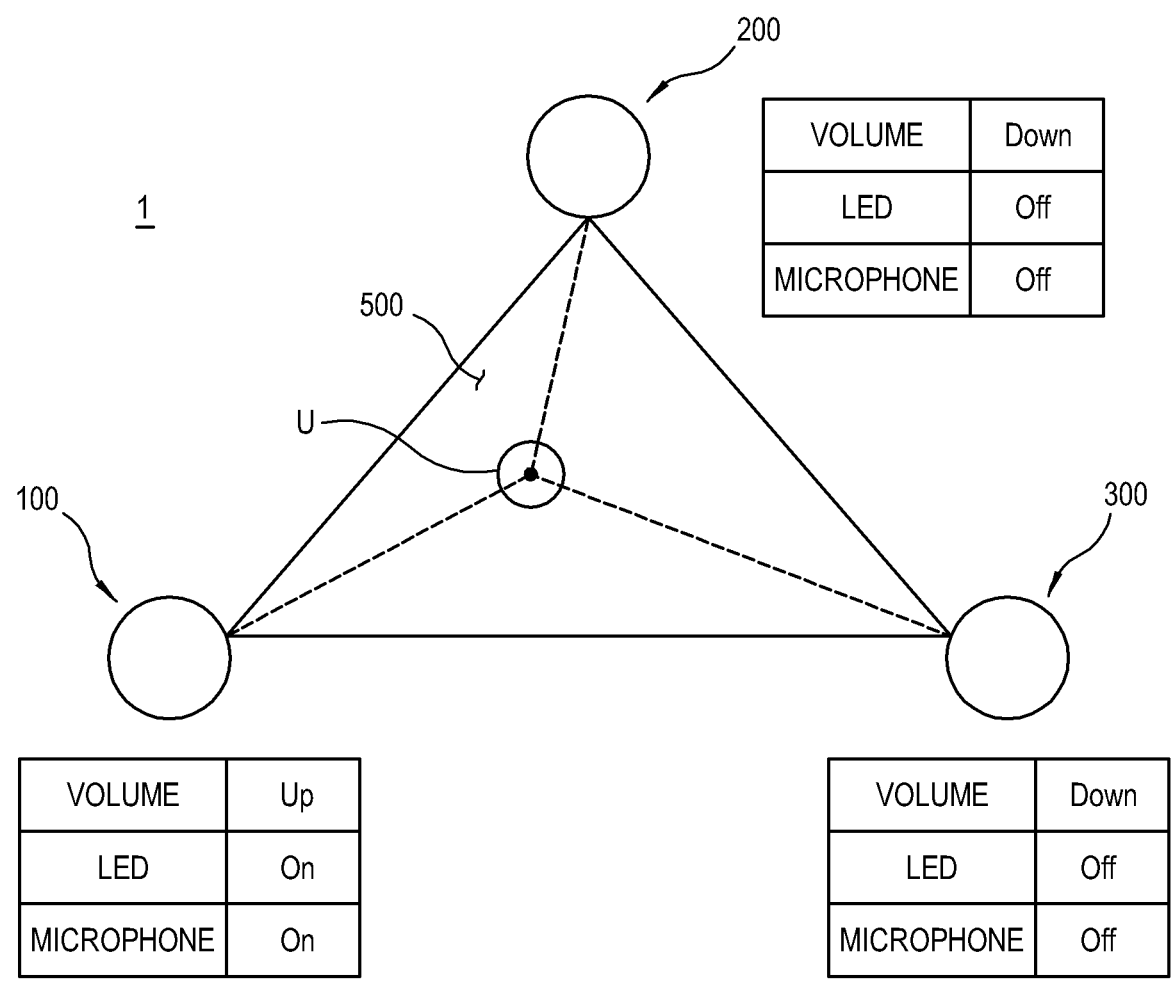
FIG. 10 illustrates sub-modules in an audio apparatus controlling various operations in accordance with a user's position.

FIG. 10 illustrates the sub-modules 100, 200 and 300 in the audio apparatus 1 respectively controlling their various operation modes in accordance with a user's position.

As shown in FIG. 10, a current position of a user U is closer to the first sub-module 100 than to the second sub-module 200 or the third sub-module 300 within the voice field 500 formed by the plurality of sub-modules 100, 200 and 300.

In this case, the first sub-module 100 may turn up a volume level of an output sound because the user U is relatively close to the first sub-module 100. On the other hand, the second sub-module 200 and the third sub-module 300 may turn down a volume level of an output sound because the user U is relatively distant from them.

However, the volume level of the sound does not have to be turned up when the user U gets closer to the corresponding sub-module. For example, the audio volume may be controlled inversely. That is, the first sub-module 100 may turn down the volume of the sound, while the second sub-module 200 and the third sub-module 300 may turn up their respective sound volumes.

If the user U is relatively closer to the first sub-module 100, the user U is likely to view or control the first sub-module 100 rather than the second sub-module 200 and the third sub-module 300. In this regard, the first sub-module 100 may turn on or turn up the LEDs, and the second sub-module 200 and the third sub-module 300 turn off or dim the LEDs. Here, the LEDs refer to the respective indicator rings or the displays of the sub-modules 100, 200 and 300.

Further, the first sub-module 100 may turn on or turn up the microphone, and the second sub-module 200 and the third sub-module 300 may turn off or turn down the microphone, when the user U approaches the first sub-module 100.

As illustrated in these examples, the audio apparatus 1 may control various operation modes of the sub-modules 100, 200 and 300 in accordance with the relative positions of the user U with respect to each of the sub-modules 100, 200 and 300.

Below, some of these operation modes of the sub-modules 100, 200 and 300 will be described.

Figure 11:
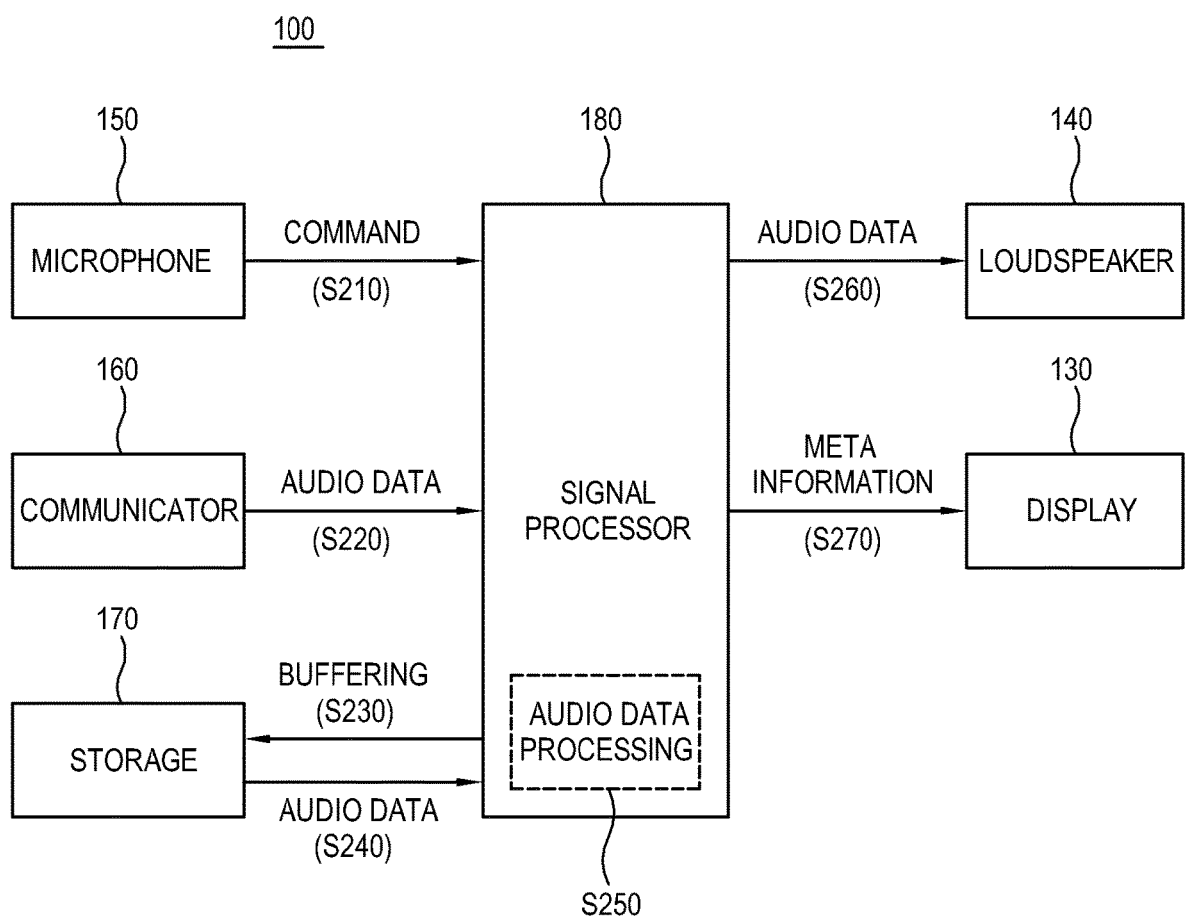
FIG. 11 is a block diagram illustrating a sound reproduction mode of a sub-module in an audio apparatus.

FIG. 11 is a block diagram illustrating a sound reproduction mode of the sub-module 100 in the audio apparatus 1.

As shown in FIG. 11, the sub-module 100 enters the sound reproduction mode (i.e., sound playback mode) in response to a certain event. For example, at operation S210, a predefined command may be input to the sub-module 100 through the microphone 150, and the sub-module 100 may operate in the sound reproduction mode.

At operation S220, the communicator 160 may receive audio data having a predetermined amount of data per unit time from the external apparatus, such as a mobile phone, a tablet computer, a desktop computer, etc., and transmit the audio data to the signal processor 180. The amount of audio data received at the communicator 160 per unit time may vary depending on various factors such as a communication protocol supported by the communicator 160, the capacity of the storage 170, the processing capabilities of the signal processor 180, etc.

At operation S230, the signal processor 180 may buffer (i.e. temporarily store) the audio data from the communicator 160 in the storage 170. The audio data may be directly buffered from the communicator 160 to the storage 170 without passing through the signal processor 180.

At operation S240, the signal processor 180 may obtain the audio data buffered in the storage 170, and at operation S250, the obtained audio data may be processed. The processing of the audio data may, for example, include extraction of metadata from the audio data, decoding of the audio data, amplification and volume control of the decoded audio data, etc. In this process, the signal processor 180 may adjust the output state of the sound in accordance with a user's position as described above.

At operation S260, the signal processor 180 may output the processed audio data to the loudspeaker 140.

In addition, at operation S270, the signal processor 180 may display the meta information (i.e., metadata) on the display 130. The meta information may include various types of information about the audio data. For example, if the audio data is represents a song, the meta information may include a title, an artist, a release date, album information including a song listing, etc.

Here, the signal processor 180 may selectively process the meta information to be displayed in accordance with predefined conditions. For example, the meta information may be displayed when the voice recognition mode of the sub-module 100 is activated, but the meta information may be not displayed when the voice recognition mode of the sub-module 100 is deactivated.

Thus, if the sub-module 100 outputs a sound in the sound reproduction mode, the sub-module 100 may provide two kinds of interfaces for allowing a user to control the output state of the sound. For example, a first user interface may be provided when the voice recognition mode of the sub-module 100 is deactivated, and may enable a user to control the sub-module 100 by directly manipulating the dial provided in the sub-module 100. Additionally, a second user interface may be provided when the voice recognition mode of the sub-module 100 is activated, and may enable a user to control the sub-module 100 by user's voice.

Below, a user's manipulation of the voice recognition mode of the sub-module 100 will be described.

Figure 12:
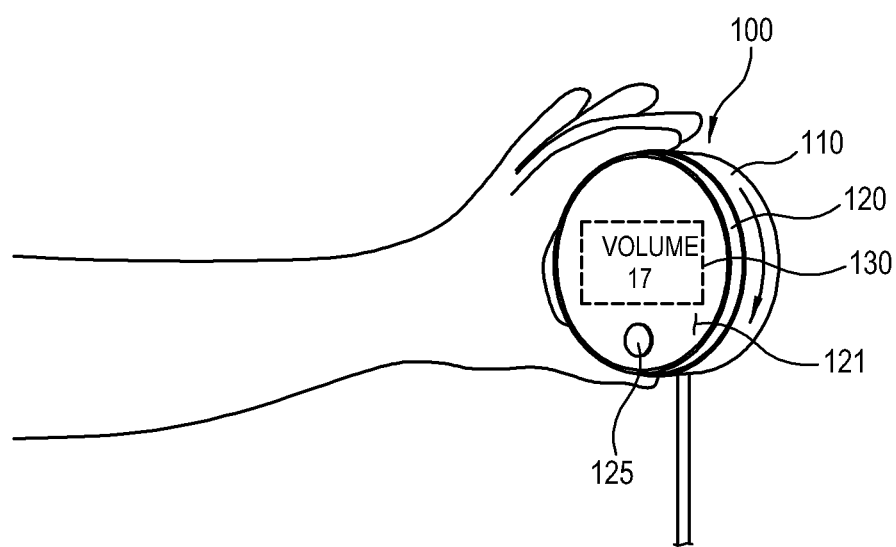
FIG. 12 is a perspective view of a back frame of a sub-module in an audio apparatus being manipulated by a user.

FIG. 12 is a perspective view of the back frame 110 of the sub-module 100 in the audio apparatus.

As shown in FIG. 12, the sub-module 100 may include the back frame 110, the front frame 120, the display 130 recognizable by a user through the surface 121 of the front frame 120, and the toggle button 125 provided in a lower portion on the surface 121 of the front frame 120.

The toggle button 125 may be toggled by a user to activate or deactivate the voice recognition mode of the sub-module 100. If the voice recognition mode is deactivated by the toggle button 125, a user may perform manipulation by directly turning the back frame 110 or the front frame 120 having the dial structure of the sub-module 100.

As a user turns the back frame 110, the sub-module 100 may, for example, control the volume of the output sound. Further, the sub-module 100 may display information about the controlled volume while controlling the sound volume.

The operation of the sub-module 100 in response to a user's manipulation of turning the back frame 110 or the front frame 120 may be performed in connection with the activation of the voice recognition mode of the sub-module 100 or regardless of the activation of the voice recognition mode of the sub-module 100.

In the former case, the sub-module 100 operates in response to the rotation of the back frame 110 or the front frame 120 when the voice recognition mode is activated, but does not operate in response to the rotation of the back frame 110 or the front frame 120 when the voice recognition mode is deactivated. In the latter case, the sub-module 100 operates in response to the rotation of the back frame 110 or the front frame 120 regardless of the activation of the voice recognition mode.

Figure 13:
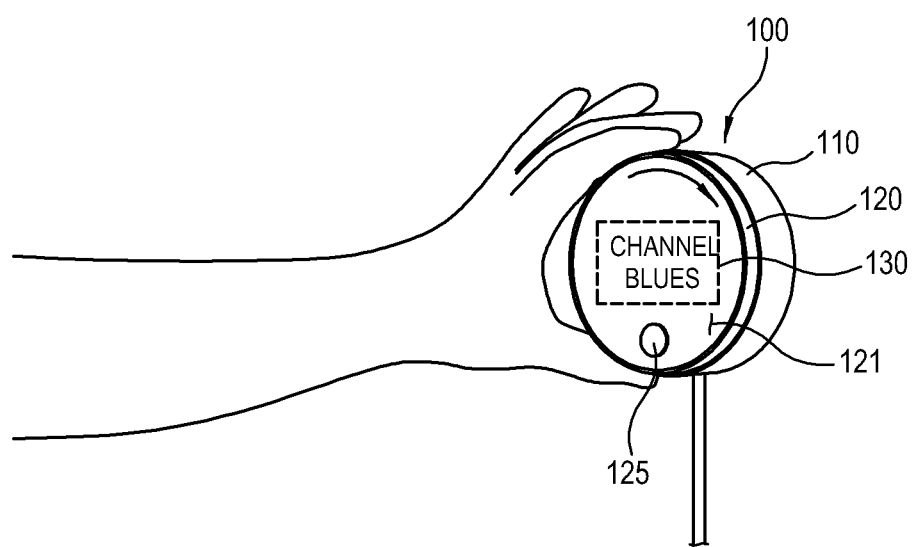
FIG. 13 is a perspective view of a front frame of a sub-module in an audio apparatus being manipulated by a user.

FIG. 13 is a perspective view of the front frame 120 of the sub-module 100 in the audio apparatus being manipulated by a user.

As shown in FIG. 13, the sub-module 100 may switch between categories or channels of audio data currently being reproduced, in response to a user turning the front frame 120. For example, the sub-module 100 may switch to a first category of the currently reproduced audio data into a second category, and reproduce audio data of the second category. If, for example, a plurality of audio data files belong to the second category, the audio data files may be selected in a predefined order.

If a plurality of audio data files belong to the second category, there are various ways of selecting the file to be switched and reproduced. One example is to always select the first file when the audio data files in the second category are sorted in a predetermined order according to various parameters. Here, the parameter may, for example, include a file name, a file modified time, a file generated time, or an artist name if the audio data is related to music.

Another example is to select the last reproduced (i.e., last played) file when the audio data files of the second category are sorted in a predetermined order. In this case, a use history has to be stored and accessed by the sub-module 100. The use history may be stored in the sub-module 100, or in an external apparatus from which the sub-module 100 receives the audio data.

Below, a principle of switching the category of the audio data files will be described.

Figure 14:
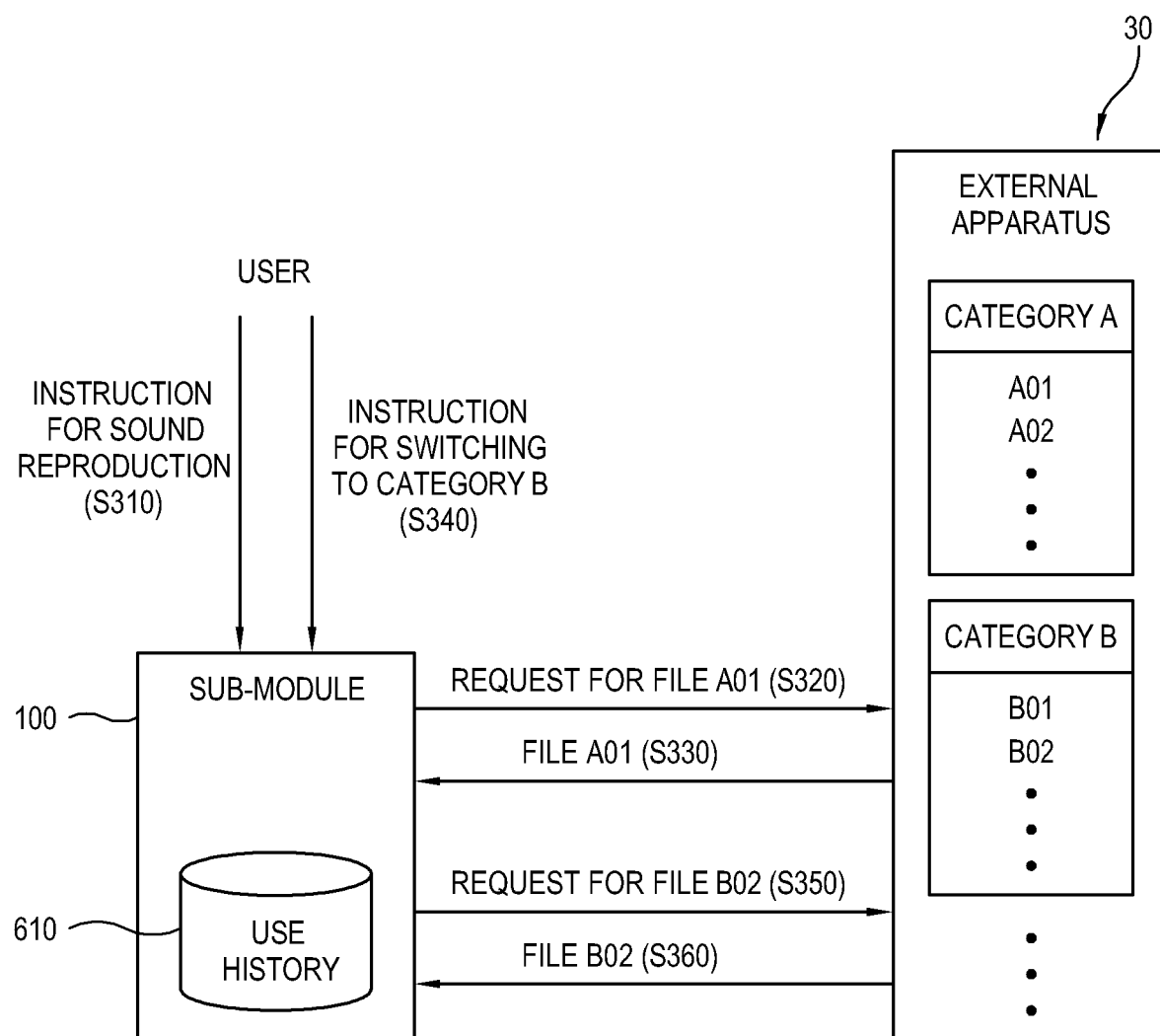
FIG. 14 is a block diagram illustrating a process of switching among categories of audio data received from an external apparatus.

FIG. 14 is a block diagram illustrating a process of switching among categories of audio data received from an external apparatus 30.

As shown in FIG. 14, the external apparatus 30 may store the audio data files according to the plurality of categories. The sub-module 100 may communicate with the external apparatus 30 and receive the audio data files from the external apparatus 30 in the sound reproduction mode.

At operation S310, the sub-module 100 may receive a user's instruction for sound reproduction.

At operation S320, the sub-module 100 may access a use history 610 (i.e., playback history), and send a request for a file A01 of Category A indicated by the use history 610 to the external apparatus 30. The use history 610 may be stored in the sub-module 100, the external apparatus 30 or another separate apparatus.

At operation S330, the external apparatus 30 may transmit the file A01 of Category A among the plurality of previously stored categories to the sub-module 100 in response to the request from the sub-module 100. Thus, the sub-module 100 may reproduce the file A01 of Category A.

In this embodiment, the sub-module 100 sends to the external apparatus 30 a request for one file, and the external apparatus 30 transmits the one file corresponding to the request to the sub-module 100. However, the disclosure is not limited to such a 1:1 correspondence. Alternatively, 1:N correspondence, N:1 correspondence, N:N correspondence, etc. are also possible. Here, N is a positive integer. For example, when the sub-module 100 makes a request for the file A01 of Category A, the external apparatus 30 may transmit the file A01 together with a predetermined number of subsequent files within Category A to the sub-module 100 in accordance with 1:N correspondence.

At operation S340, the sub-module 100 may receive a user's instruction for switching the current category from A to B. Such a switching instruction may be carried out as described above with reference to FIG. 13.

At operation S350 the sub-module 100 calls the use history 610, checks the last reproduced file B02 among the audio data files within the category B, and makes a request for the file B02 of the category B to the external apparatus 30.

At operation S360, the external apparatus 30 may select Category B instead of Category A in response to the request from the sub-module 100, and transmit the file B02 of Category B to the sub-module 100.

Consequently, the sub-module 100 may reproduce the file B02.

In addition, the sub-module 100 may recognize a user's speech input through the microphone while the voice recognition mode is activated, and thus operate based on a command corresponding to the recognized speech. In the voice recognition mode, the sub-module 100 may recognize a user's speech and is therefore capable of supporting various functions more complex or specific than when a more limited input method is used, such as manipulating dials. Under the voice recognition mode, the functions supported by the sub-module 100 may include making a phone call using the mobile phone, controlling another device through a hub, etc.

Below, an exemplary embodiment, in which the sub-module 100 accesses a mobile phone and sends a message to another mobile phone, will be described.

Figure 15:
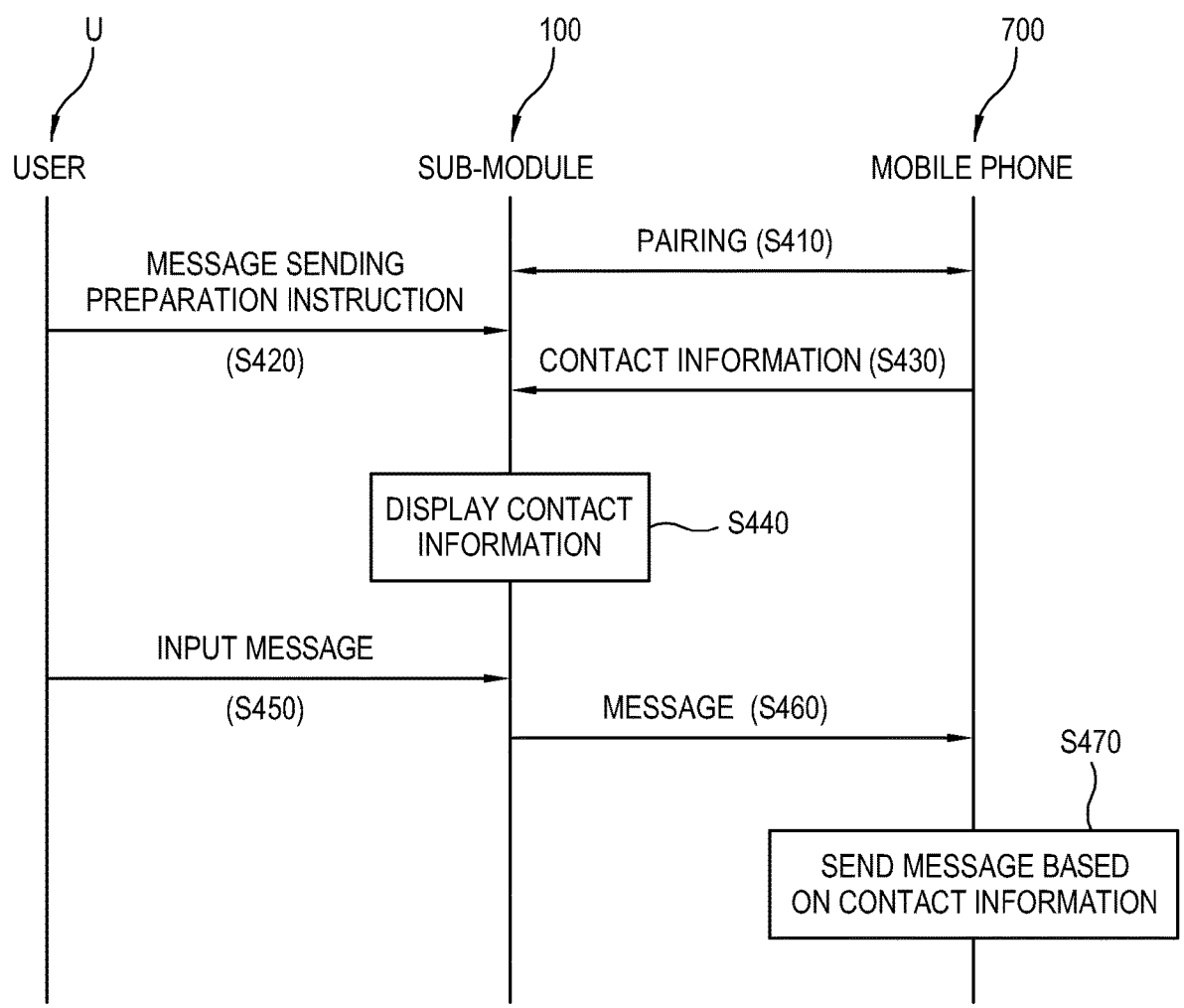
FIG. 15 is a sequence diagram illustrating a method of a sub-module in an audio apparatus sending a message through a mobile phone.

FIG. 15 is a sequence diagram illustrating a method of the sub-module 100 in the audio apparatus 1 sending a message through a mobile phone 700.

As shown in FIG. 15, at operation S410, the sub-module 100 may perform pairing to communicate with the mobile phone 700.

At operation S420, the sub-module 100 may receive a message sending preparation instruction from a user U. The message sending preparation instruction may be input to the sub-module 100 by a speech of the user U, and may include information for specifying a target to which a message will be sent. This information may, for example, include a name, a nickname, etc. stored corresponding to a phone number registered to a mobile phone 700.

At operation S430, the sub-module 100 may acquire contact information of a target specified by the message sending preparation instruction from the mobile phone 700. For example, the sub-module 100 acquires phone numbers of the people stored in the mobile phone 700, and retrieves a phone number of the target, specified by the message sending preparation instruction, among the phone numbers.

At operation S440, the sub-module 100 may display the acquired contact information. Thus, a user can confirm whether the sub-module 100 correctly identified the target specified by the message sending preparation instruction.

At operation S450, the sub-module 100 may receive a message input from the user U. The message input is for receiving the content of the message to be sent to the phone number specified by the message sending preparation instruction. In this embodiment, the message is input to the sub-module 100 via speech recognition based on the user U's speech.

At operation S460, the sub-module 100 may send the message to the mobile phone 700.

At operation S470, the mobile phone 700 may send the received message to the corresponding phone number. The message may be sent via, for example, short message service (SMS), instant messaging, email, etc.

Thus, the sub-module 100 may send a message input based on a user's voice via the mobile phone 700.

Below, an embodiment where the sub-module 100 accesses a mobile phone and sends a message to another mobile phone will be described.

Figure 16:
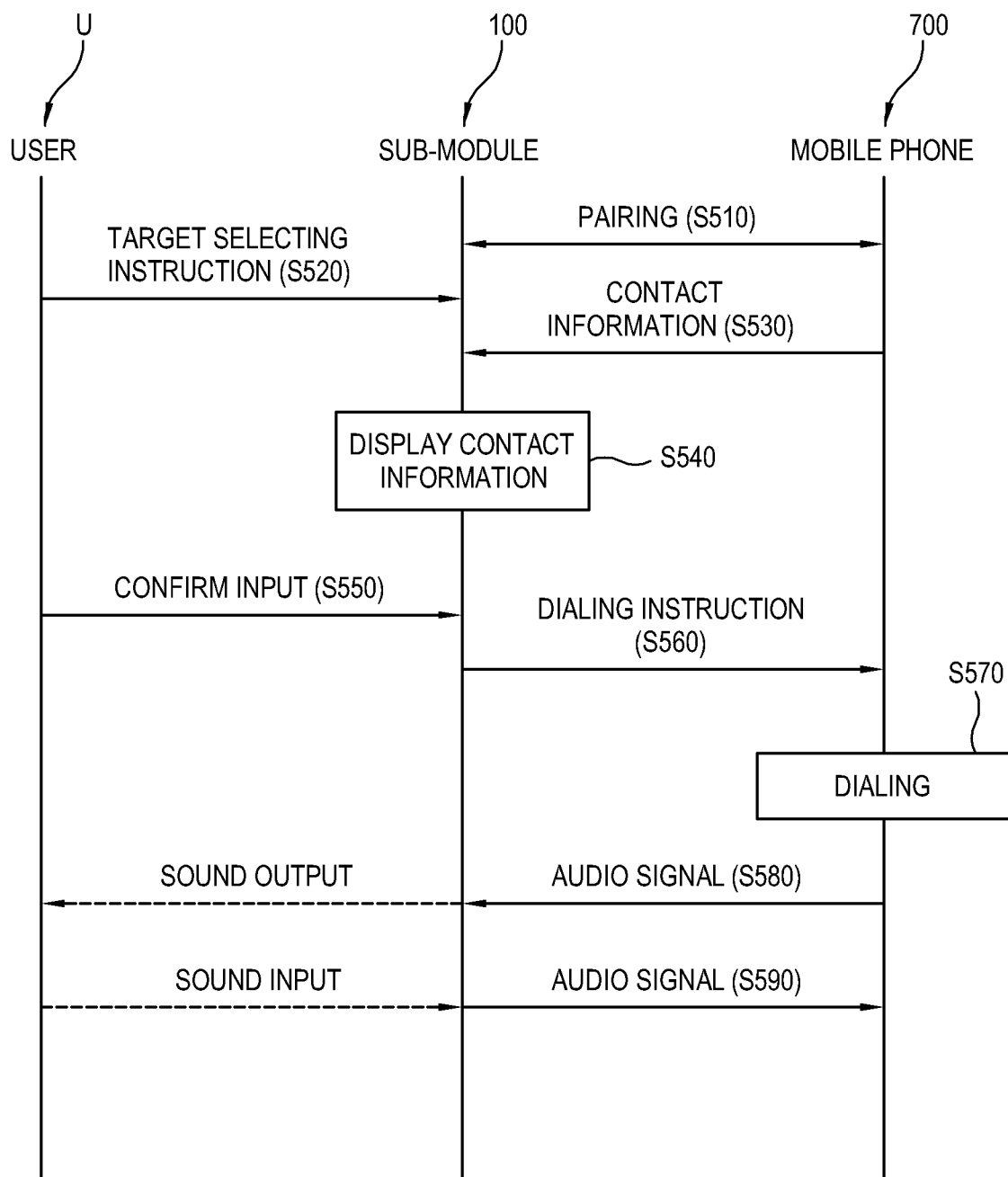
FIG. 16 is a sequence diagram illustrating a method of a sub-module in an audio apparatus making a phone call through a mobile phone.

FIG. 16 is a sequence diagram illustrating a method of the sub-module 100 in the audio apparatus 1 making a phone call through the mobile phone.

As shown in FIG. 16, at operation S510, the sub-module 100 may perform paring with the mobile phone 700.

At operation S520, the sub-module 100 may receive a target selecting instruction from a user U. The target selecting instruction includes information for specifying a target, to which the sub-module 100 makes a phone call through the mobile phone 700. The target selecting instruction may be input to the sub-module 100 by a speech of a user U.

At operation S530, the sub-module 100 may acquire contact information of a target specified by the target selecting instruction, and at operation S540, the sub-module 100 may display the acquired information.

If the user U confirms the displayed information at operation S550, the sub-module 100 may send a dialing instruction for the target to the mobile phone 700 at operation S560.

At operation S570, the mobile phone 700 may begin dialing for the target in response to the dialing instruction. During the operation S570, the sub-module 100 may display a message that the dialing is being performed.

If the mobile phone 700 connects with the target, at operation S580, the mobile phone may receive an audio signal from the target mobile phone and transmit the audio signal to the sub-module 100, thereby outputting a sound of the audio signal through the loudspeaker of the sub-module 100. Further, at operation S590, the mobile phone 700 may transmit an audio signal received from the sub-module 100 to the target mobile phone.

Thus, the sub-module 100 may make a phone call to another mobile phone through the mobile phone 700 in response to a voice instruction of a user U.

Below, an exemplary embodiment, where the sub-module 100 controls another external device through a hub based on Internet of Things (IoT), will be described.

Figure 17:
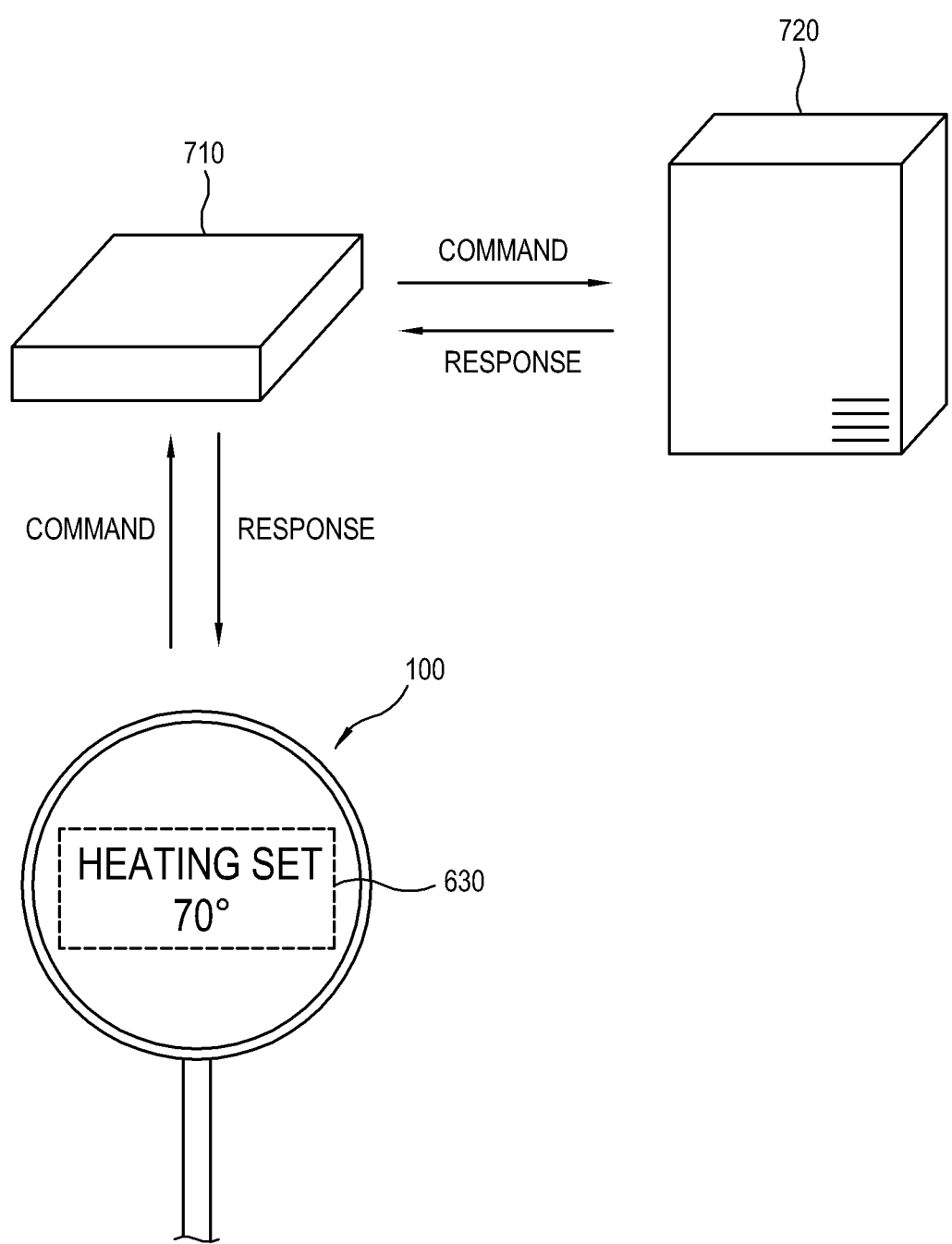
FIG. 17 illustrates a process of a sub-module in an audio apparatus controlling an external device through a hub.

FIG. 17 illustrates a process of the sub-module 100 in the audio apparatus 1 controlling an external device 720 through a hub 710.

As shown in FIG. 17, the sub-module 100 may be provided to control the external device 720 through the hub 710. The hub 710 may group the sub-module 100, the external device 720, and other devices (e.g., devices found in the same network based on a common protocol).

Here, the common protocol is as follows. To group a plurality of "things" (i.e., electronic devices) in the network, the things need to be capable of not only communicating with each other but also recognizing and processing a command exchanged between them. To this end, things within a network need to operate on a common or compatible application or platform. For example, a thing on a transmission side, which operates on a certain platform, may transmit a signal to a thing on a receiving side through a hub. In this case, if the thing on the receiving side operates on the platform in common with the thing on the transmitting side, it can recognize and process the received signal. Likewise, if a plurality of things are operating on the common or compatible application or platform, the respective things are regarded as though they are operating based on a common protocol.

The things may include a television; an electronic picture frame and like display apparatus capable of displaying an image; a set-top box and like image processing apparatus capable of processing a video signal without directly displaying an image; home appliances such as a washing machine, a refrigerator, an air conditioner and the like; office equipment such as a printer, a copying machine, a scanner and the like; and other devices such as a light bulb, an electric heater and the like. Further, the things may include various wearable devices or mobile devices mounted with a sensor.

For example, the external device 720 may be a water heater, and a user may set a temperature of the water heater. In this case, for example, if the user may utters a voice command, "set temperature to 70 degrees," the sub-module 100 may recognize and analyze the user's speech. In accordance with the analysis results, the sub-module 100 may deduce a target and an instruction based on the user's speech. In this example, the sub-module 100 may deduce from the user's speech that the target is the external device 720 (i.e., the water heater) and the instruction is to set the temperature to 70 degrees Celsius.

The sub-module 100 may issue a command to the external device 720 through the hub 710 for adjusting the temperature to 70 degrees.

The external device 720 may interpret the command received from the sub-module 100 through the hub 710, and adjust the temperature to 70 degrees in response to the command. Then, the external device 720 may send to the sub-module 100 a response indicating that the instruction was performed successfully, through the hub 710.

The sub-module 100 may display a message 630 indicating that the temperature is set to 70 degrees based on the response received from the external device 720.

Thus, the sub-module 100 can control the operations of the external device 720 based on the Internet of Things (IoT) technology in the manner described above.

The methods according to the foregoing exemplary embodiments may be achieved in the form of a program command or instructions that can be implemented in various computers, and recorded in a computer-readable medium. Such a computer-readable medium may include a program command, a data file, a data structure or the like, or a combination thereof. For example, the computer-readable medium may be a nonvolatile storage, such as a read-only memory (ROM) or the like, regardless of whether the storage is erasable or rewritable. For example, the computer-readable medium may be a RAM, a memory chip, a device or integrated circuit (IC)-like memory, an optically or magnetically recordable or machine-readable storage medium such as a compact disc (CD), a digital versatile disc (DVD), a magnetic disk, a hard disk drive, a solid-state drive, a magnetic tape or the like. It will be appreciated that a memory, which can be included in a mobile terminal, is an example of the machine-readable storage medium suitable for storing a program having instructions for materializing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An audio apparatus comprising:
a plurality of sub-modules for placing at locations separate from one another, each sub-module of the plurality of sub-modules comprising a microphone, a speaker, a communicator and a processor,
wherein the processor of a first sub-module among the plurality of sub-modules is configured to:
process audio signals to be output as sound through the speakers of the first sub-module, and
turn up a volume level of the speaker of the first sub-module in response to a position of a user moving closer to the first sub-module than to a second sub-module among the plurality of sub-modules,
wherein the processor of the second sub-module among the plurality of sub-modules is configured to:
process audio signals to be output as sound through the speaker of the second sub-module, and
turn down a volume level of the speaker of the second sub-module in response to the position of the user moving closer to the first sub-module than to the second sub-module among the plurality of sub-modules, and
wherein the position of the user with respect to the sub-module is determined based on a signal produced by the speakers of the sub-modules and the recorded by the microphones of the sub-modules.

2. The audio apparatus according to claim 1, wherein the processors are further configured to define each area corresponding to positions of the first sub-module and the second sub-module based on distances between the first sub-module and the second sub-module, and determine the position of the user with respect to the defined area.

3. The audio apparatus according to claim 2, wherein the processor of the first sub-module is further configured to determine a first distance between the first sub-module and the second sub-module based on a time taken by an ultrasonic wave to be output from the speaker of the first sub-module, reflected from the second sub-module and received by the microphone of the first sub-module.

4. The audio apparatus according to claim 3, wherein the processor of the first sub-module is further configured to receive information about a second distance between the second sub-module and a third sub-module among the plurality of sub-modules, from one of the second sub-module and the third sub-module through the communicator of the first sub-module.

5. The audio apparatus according to claim 1,
wherein the first sub-module comprises at least two microphones configured to receive sounds that are output by the first sub-module and the second sub-module, and
wherein the processor is further configured to determine the position of the user based on a phase difference between the sounds respectively received by the at least two microphones.

6. The audio apparatus according to claim 1,
wherein the processor of the first sub-module is further configured to select a channel of a plurality of channels within an audio signal, based on the position of the user, and control a volume level of the selected channel to be different from volume levels of remaining channels of the plurality of channels.

7. The audio apparatus according to claim 1, wherein each sub-module of the plurality of sub-modules further comprises a display configured to display information related to an audio signal.

8. The audio apparatus according to claim 1, wherein at least one of the processors is further configured to receive speech from the user by a respective microphone, retrieve contact information of a call recipient specified by the speech from a mobile phone connectable to a respective communicator, and dial the call recipient through the mobile phone.

9. The audio apparatus according to claim 1, wherein the first sub-module further comprises a display, and
wherein the processor of the first sub-module is further configured to activate the display, while the display is deactivated, in response to the position of the user moving closer to the first sub-module than to the second sub-module, and
deactivate the display in response to the position of the user moving closer to the second sub-module than to the first sub-module.

10. A non-transitory computer-readable medium of an audio apparatus comprising a plurality of sub-modules for placing at separate locations from one another, the non-transitory computer-readable medium storing program code for a method to be executed by processors of a first sub-module and a second sub-module among the plurality of sub-modules, the method comprising:
processing audio signals to be output as sound through speakers of the first sub-module and the second sub-module,
determining a position of a user with respect to the sub-modules based on a signal produced by speakers of the sub-modules and recorded by microphones of the sub-modules, and
turning up a volume level of the speaker of the first sub-module and turning down a volume level of the speaker of the second sub-module in response to the position of the user moving closer to the first sub-module than to the second sub-module among the plurality of sub-modules.

11. The non-transitory computer-readable medium according to claim 10, wherein the method further comprises:
defining an area corresponding to positions of the first sub-module and the second sub-module based on distances between the first sub-module and the second sub-module, and
determining the position of the user with respect to the defined area.

12. The non-transitory computer-readable medium according to claim 11,
wherein the defining comprises:
determining a first distance between the first sub-module and the second sub-module based on a time taken by an ultrasonic wave to be output from the speaker of the first sub-module, reflected from the second sub-module and received by a microphone of the first sub-module.

13. The non-transitory computer-readable medium according to claim 12, wherein the defining comprises:
receiving information about a second distance between the second sub-module and a third sub-module among the plurality of sub-modules, from one of the second sub-module and the third sub-module.

14. The non-transitory computer-readable medium according to claim 10, wherein the first sub-module comprises at least two microphones configured to receive sounds that are output by the first sub-module and the second sub-module, and wherein the method comprises:
determining the position of the user based on a phase difference between the sounds respectively received by the at least two microphones.

15. The non-transitory computer-readable medium according to claim 10, further comprising:
selecting a channel of a plurality of channels within an audio signal, based on the position of the user, and
controlling a volume level of the selected channel to be different from volume levels of remaining channels of the plurality of channels.

16. The non-transitory computer-readable medium according to claim 10, the method further comprising:
controlling a volume level of the sound being output through a speaker in accordance with the position of the user.

17. The non-transitory computer-readable medium according to claim 10, wherein the each sub-module of the plurality of sub-modules further comprises a display configured to display information related to an audio signal, and a microphone is configured to receive a sound input.

18. The non-transitory computer-readable medium according to claim 10, the method further comprising:
receiving speech from the user by a microphone,
retrieving contact information of a call recipient specified by the speech from a mobile phone connectable to the first sub-module, and
dialing the call recipient through the mobile phone.

19. The non-transitory computer-readable medium according to claim 10, the method further comprising:
activating a display of the first sub-module, while the display is deactivated, in response to the position of the user moving closer to the first sub-module than to the second sub-module, and
deactivating the display of the first sub-module in response to the position of the user moving closer to the second sub-module than to the first sub-module.

* * * * *